US006913217B2

United States Patent
Ishihara

(10) Patent No.: US 6,913,217 B2
(45) Date of Patent: Jul. 5, 2005

(54) RECORDING TAPE CARTRIDGE

(75) Inventor: Yusuke Ishihara, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/735,760

(22) Filed: Dec. 16, 2003

(65) Prior Publication Data
US 2004/0124301 A1 Jul. 1, 2004

(30) Foreign Application Priority Data

Dec. 19, 2002 (JP) ........................................ 2002-368144

(51) Int. Cl.[7] ............................................. G11B 23/04
(52) U.S. Cl. ..................................... 242/338.1; 360/132
(58) Field of Search ............................. 242/338.1, 343, 242/348; 360/132

(56) References Cited

U.S. PATENT DOCUMENTS

| 5,901,916 | A | 5/1999 | McAllister et al. | |
| 6,318,657 | B1 * | 11/2001 | Nayak | 242/338.1 |
| 6,462,905 | B1 * | 10/2002 | Takahashi et al. | 360/132 |
| 6,499,686 | B2 * | 12/2002 | Tsuyuki et al. | 360/132 |
| 6,581,866 | B2 | 6/2003 | Tsuyuki et al. | |
| 2001/0028010 | A1 * | 10/2001 | Tsuyuki et al. | 242/338.1 |

FOREIGN PATENT DOCUMENTS

| JP | 63-251983 A | 10/1988 |
| JP | 3187022 B2 | 5/2001 |
| JP | 2002-276805 A | 9/2002 |

* cited by examiner

Primary Examiner—William A. Rivera
(74) Attorney, Agent, or Firm—Sughrue Mion, PLLC

(57) ABSTRACT

A recording tape cartridge enabling proper assembly of a brake member which blocks rotation of a reel during non-use. A magnetic tape is wound on a reel accommodated in a case. The brake member is non-rotatably supported in the case and moves toward/away from a base portion inside a reel hub. Rotation of the reel is disabled when a brake gear provided at a disc portion meshes with gear teeth, and rotation is enabled when this meshing is released. Tapering walls stand along a circular periphery larger in diameter than an outer diameter of the brake member and coaxial with the hub. When the brake member is being inserted into the hub, the brake member is guided, at the disc portion and at a rim portion extending out from the disc portion, by the tapering walls to a position at which the brake gear meshes with the gear teeth.

15 Claims, 14 Drawing Sheets

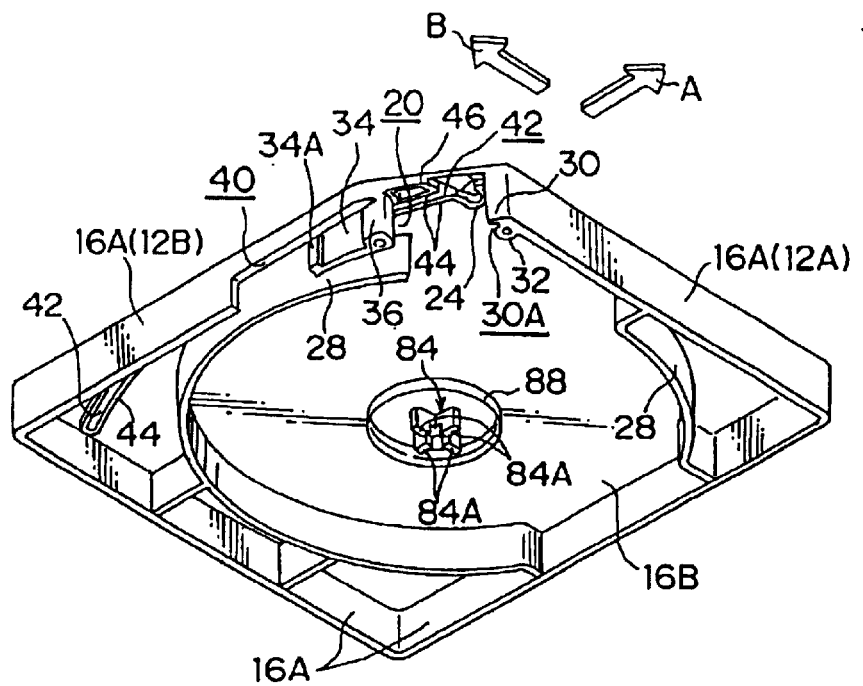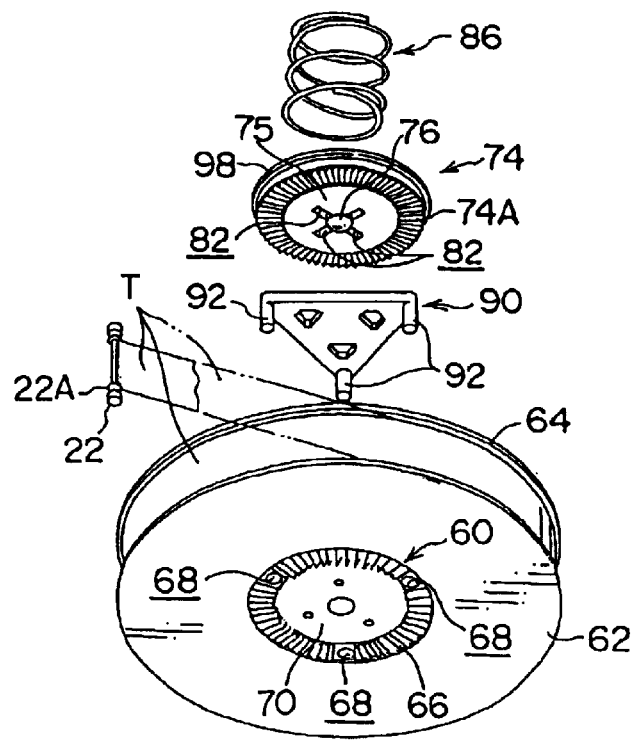
FIG.6

RECORDING TAPE CARTRIDGE

CROSS-REFERENCE TO RELATED APPLICATION

This application claims priority under 35USC 119 from Japanese Patent Application No. 2002-368144, the disclosure of which is incorporated by reference herein.

BACKGROUND OF THE INVENTION

1. Field of the Invention

The present invention relates to a recording tape cartridge which rotatably accommodates a reel onto which recording tape, such as a magnetic tape or the like, is wound.

2. Description of the Related Art

Recording tapes such as magnetic tapes and the like are used as external recording media for computers and the like. "One-reel" recording tape cartridges, which rotatably accommodate a single reel onto which a recording tape is wound in a case, can reduce space for accommodation during storage and can record large amounts of information, and are employed as such recording tapes.

Such a recording tape cartridge is equipped with a brake structure such that the reel does not rotate inside the case at times of non-use (see, for example, the specification of Japanese Patent No. 3,187,022). A recording tape cartridge equipped with this brake structure is now described with reference to FIGS. 13 and 14.

In a recording tape cartridge 200 shown in FIG. 13, a single reel 204 is accommodated in a case 202. The case 202 is formed by joining peripheral walls of a lower case 202A and an upper case 202B to one another. The case 202 is provided with a gear aperture 206 and a rotation-limiting rib 208. The gear aperture 206 is formed at a central portion of a floor plate of the lower case 202A of the case 202. The rotation-limiting rib 208 protrudes downward from a ceiling plate of the upper case 202B of the case 202.

The reel 204 is provided with a reel hub 210, which is formed in the shape of a circular tube with a base, around an outer peripheral portion of which recording tape is wound. At a lower face of a base portion 210A of the reel hub 210, a reel gear 214 is formed in an annular shape. The reel gear 214 is meshable with a driving gear 212A, which is formed at a rotation shaft 212 of a drive device. Insertion through-holes 216, which penetrate through the base portion 210A, are formed at a plurality of locations on a circular periphery, at the portion at which the reel gear 214 is formed. The insertion through-holes 216 are equidistant. A diameter of each insertion through-hole 216 is set to be larger than a gear pitch of the reel gear 214, and teeth of the reel gear 214 are not provided in a vicinity around each insertion through-hole 216.

At an upper face of the base portion 210A of the reel hub 210, engaging protrusions 218 are provided standing from (portions of) a plurality of locations along the predetermined circular periphery, between the insertion through-holes 216. Gear teeth 218A are formed at upper end portions of the engaging protrusions 218.

A disc-like brake member 220 is insertedly provided inside the reel hub 210. At a lower face of the brake member 220, an annular brake gear 220A is provided. The brake gear 220A is meshable with the gear teeth 218A. A projection 222 is provided standing from an upper face of the brake member 220. The projection 222 is provided with an insertion groove 222A, into which the rotation-limiting rib 208 of the case 202 is inserted. When the rotation-limiting rib 208 is entered into the insertion groove 222A, the brake member 220 is rendered incapable of rotating relative to the case 202. Further, the brake member 220 is rendered movable only in a vertical direction, being guided by the rotation-limiting rib 208.

A compression coil spring 224 is disposed between the ceiling plate of the upper case 202B and the brake member 220. Usually, the brake member 220 is urged downward by urging force of the compression coil spring 224, such that the brake gear 220A is meshed with the gear teeth 218A. Therefore, the brake member 220 is usually set to a rotation-locked state in which rotation of the reel 204 relative to the case 202 is blocked. Moreover, the reel 204 is pressed against the floor plate of the lower case 202A by this urging force, and the reel gear 214 is exposed through the gear aperture 206.

A release member 226 is disposed between the base portion 210A of the reel hub 210 and the brake member 220, so as to abut against the base portion 210A and the brake member 220. The release member 226 is formed in a plate form which does not interfere with the engaging protrusions 218, and is provided with leg portions 226A, which are respectively inserted into the insertion through-holes 216.

Thus, when the driving gear 212A is operated to mesh with the reel gear 214, as shown in FIG. 14, the leg portions 226A are pushed by the driving gear 212A, against the urging force of the compression coil spring 224, and the release member 226 is pushed upward. The release member 226 moves away from the base portion 210A and pushes the brake member 220 upward. Thus, meshing between the brake gear 220A and the gear teeth 218A is released. At this time, the reel 204 also rises relative to the floor plate of the lower case 202A, and the reel 204 becomes rotatable inside the case 202.

Hence, the reel 204, whose reel gear 214 meshes with the driving gear 212A of the rotation shaft 212, is a structure which rotates in the case 202 when the rotation shaft 212 rotates. At such a time, the release member 226 rotates with the reel 204, and an axial center portion of the release member 226 rubs against (slidingly contacts) an axial center portion of the brake member 220. Accordingly, the axial center portion of the brake member 220 is formed with a protrusion portion 220B, which is formed substantially in a spherical surface form. Thus, the axial center portion of the brake member 220 is substantially in point contact with the axial center portion of the release member 226.

Later, when the state of meshing of the driving gear 212A with the reel gear 214 is released, the brake member 220 is moved downward by the urging force of the compression coil spring 224, the brake gear 220A meshes with the gear teeth 218A, and the reel 204 is pushed against the floor plate of the lower case 202A. As a result, this structure returns to the rotation-locked state in which rotation of the reel 204 relative to the case 202 is blocked.

When the recording tape cartridge 200 is to be assembled, the reel 204 is placed on the lower case 202A such that a lower end portion of the reel hub 210 enters into the gear aperture 206. Thereafter, the leg portions 226A are respectively inserted into the insertion through-holes 216 and the release member 226 is placed on the base portion 210A of the reel hub 210. Then, the brake member 220 is placed on the engaging protrusions 218 of the reel hub 210 such that the brake gear 220A meshes with the gear teeth 218A. Further, in a state in which the compression coil spring 224 has been placed on the brake member 220, the upper case 202B is moved toward the lower case 202A while the compression coil spring 224 is compressed and the rotation-limiting rib 208 is inserted into the insertion groove 222A of the brake member 220. The peripheral walls of the upper case 202B and the lower case 202A are matched up with one another and, in this state, joined. As a result, rotation of the reel 204 relative to the case 202 in the recording tape cartridge 200 is blocked at a time of shipping, which is a time of non-use.

Further, although this is not shown in the drawings, a structure is also known in which the release member 226 is not provided (see, for example, Japanese Patent Application Laid-Open (JP-A) No. 63-251983). Herein, the protrusion portion 220B of the brake member 220 is directly pushed by a release portion, which is protrudingly provided at an axial center portion of the rotation shaft 212 and advances in through a through-hole which penetrates through the base portion 210A of the reel hub 210. Thus, the brake member 220 is pushed upward, and the rotation-locked state of the reel 204 is released. In a recording tape cartridge of this structure, rather than the engaging protrusions 218 being provided, gear teeth are provided in an annular form at the base portion of the reel hub. Thus, because of the rotation-limiting rib of the case, the brake member provides both functions of blocking rotation and guiding in a direction of moving toward/away from the gear teeth. Consequently, a process of assembling a recording tape cartridge of this structure is essentially similar to the process of assembly of the recording tape cartridge 200 described above, except for steps of assembling the release member 226.

However, with the conventional recording tape cartridge 200 as described above, when the brake member 220 is placed on the engaging protrusions 218 of the reel hub 210, if the axial center of the brake member is offset with respect to the axial center of the reel 204, the brake member 220 may be placed on the engaging protrusions 218 in a state in which tooth peaks of the brake gear 220A ride up on tooth peaks of the gear teeth 218A. In such a case, because a clearance is provided between the insertion groove 222A of the brake member and the rotation-limiting rib 208 of the upper case 202B, the rotation-limiting rib 208 is still inserted into the insertion groove 222A. Consequently, subsequent processes can be executed and the recording tape cartridge 200 assembled, and there is a risk that the recording tape cartridge 200 will be shipped in a state in which rotation of the reel 204 is still enabled. In particular, the problem described above tends to occur in a process of assembly of the recording tape cartridge 200 by manual labor.

As a countermeasure for this problem, the present applicant has previously submitted applications regarding structures provided with a tapering wall which guides the brake member 220 to a position at which the brake gear 220A meshes with the gear teeth 218A during assembly of inserting the brake member 220 into the reel hub 210 (see, for example, Japanese Patent Application No. 2002-276805). In such a structure, the tapering wall guides the brake member 220 in while aligning the brake member 220 with respect to the reel hub 210. As a result, occurrences of the brake member 220 riding up on the gear teeth 218A are greatly suppressed.

However, limiting or preventing the gear teeth of the brake member from riding up during assembly of the braking member by means of a structure different from the invention relating to Japanese Patent Application No. 2002-276805 has also been considered.

SUMMARY OF THE INVENTION

In consideration of the circumstances described above, an object of the present invention is to provide a recording tape cartridge with which simple, rapid and accurate assembly of a brake member for blocking rotation of a reel is enabled.

In order to achieve the object described above, according to a first aspect of the present invention, a tape cartridge is provided which includes: a reel; a brake member mounted at the reel so as to be reciprocally movable between a locking position for prohibiting rotation of the reel and an unlocking position for enabling rotation of the reel, the brake member including a disc portion provided at a mounting side thereof and a rim portion provided at a side of the brake member which is opposite to the mounting side thereof; and a guidance structure capable of guiding an outer periphery of the mounting side disc portion and capable of guiding the rim portion, for controlling attitude of the brake member at least during mounting of the brake member.

BRIEF DESCRIPTION OF THE DRAWINGS

FIG. 6 is an exploded perspective view, viewed from below, showing a reel and a brake structure which structure the recording tape cartridge relating to the embodiment of the present invention.

DETAILED DESCRIPTION OF THE INVENTION

A recording tape cartridge 10 relating to an embodiment of the present invention will be explained on the basis of FIGS. 1 to 10. Firstly, general overall structure of the recording tape cartridge 10, and structure of an opening and a door, will be explained. Then, a reel 14 and a brake structure which blocks rotation of the reel 14 at times of non-use, which are principal elements of the present invention, will be explained. For the sake of convenience of explanation, a loading direction of the recording tape cartridge 10 into a drive device, which is shown by arrow A, is taken as a forward direction (a front side) of the recording tape cartridge 10, and the direction of an arrow B, which intersects arrow A, is taken as a rightward direction.

Overall Structure Of Recording Tape Cartridge

Figure 1:
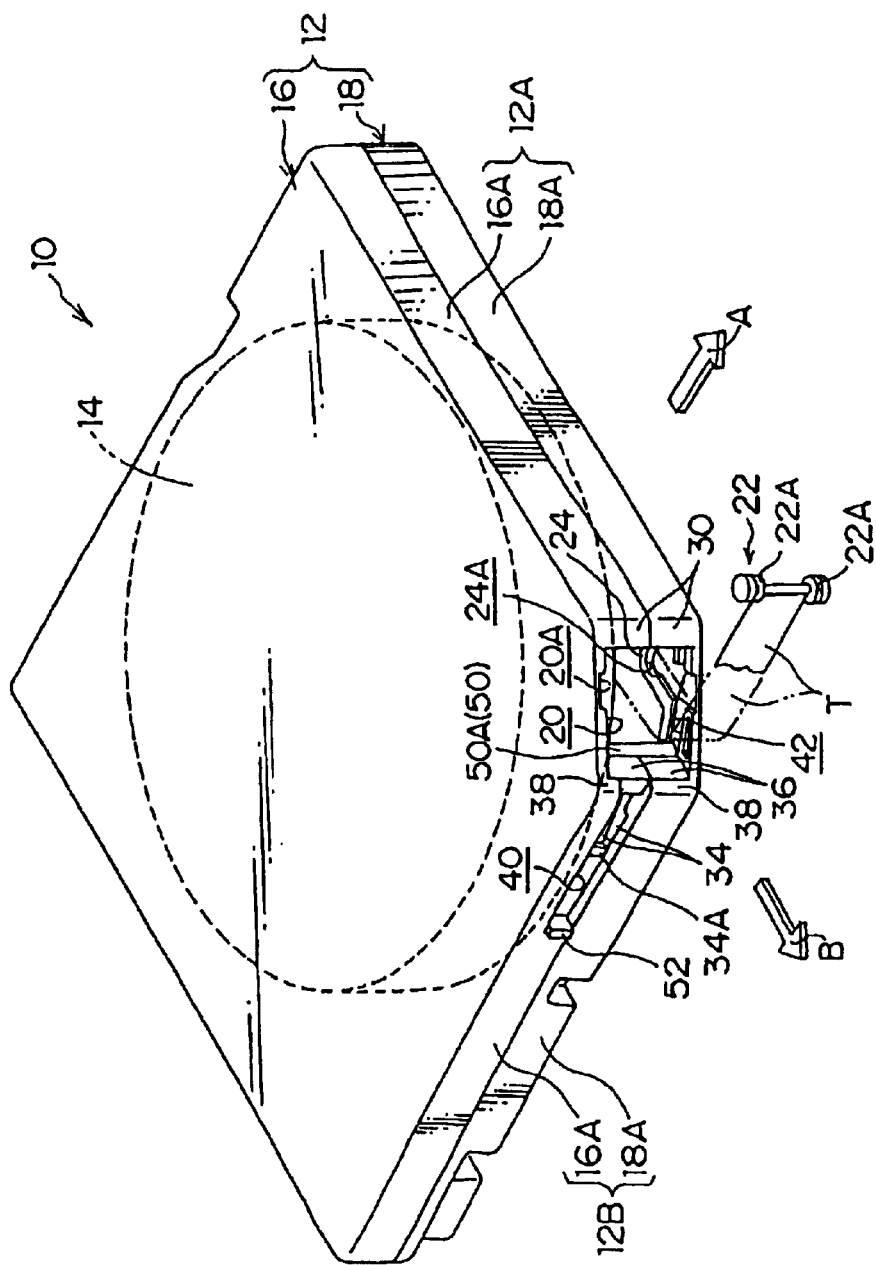
FIG. 1 is a perspective view showing overall structure of a recording tape cartridge relating to an embodiment of the present invention.
Figure 2:
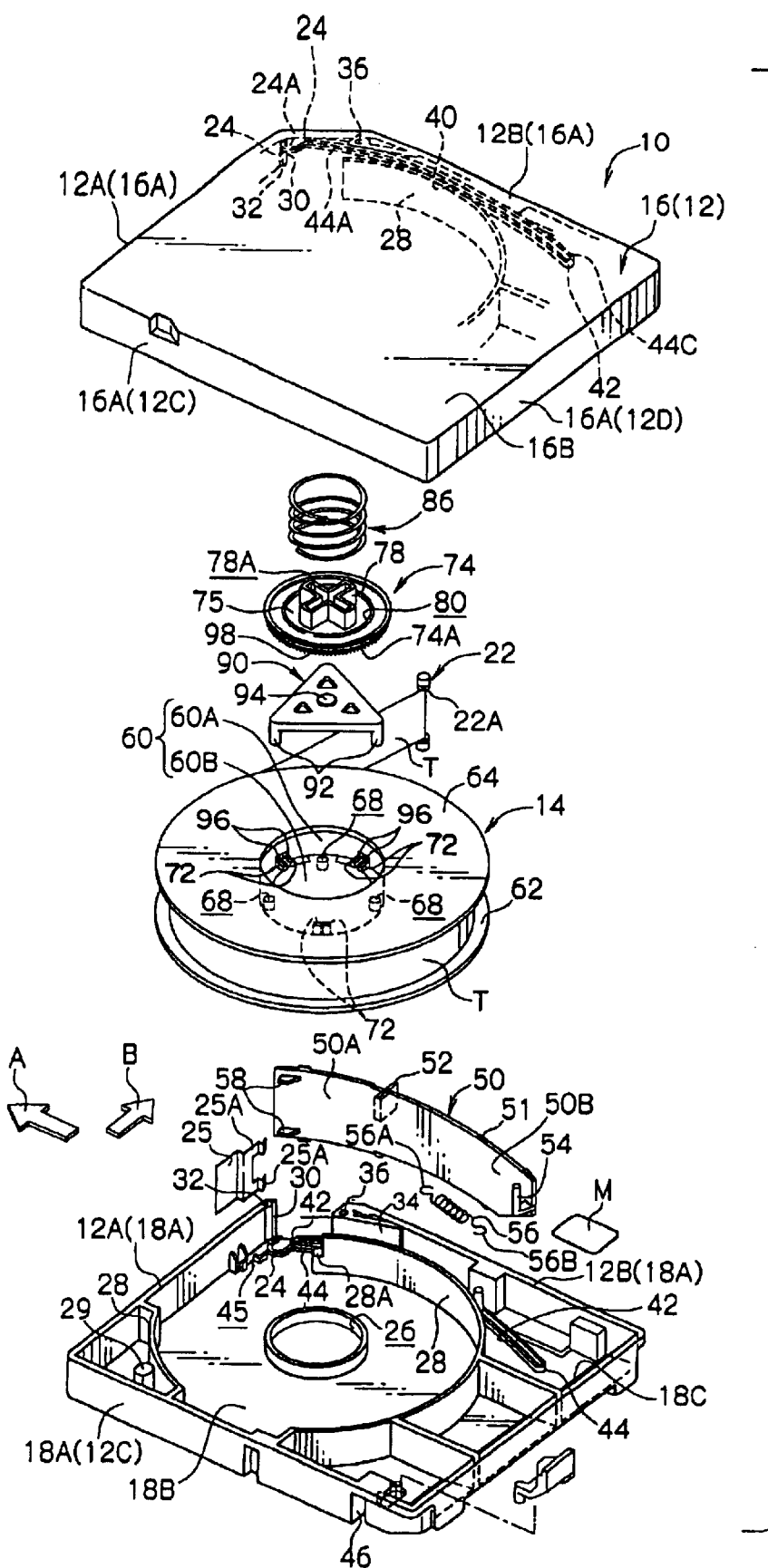
FIG. 2 is an exploded perspective view of the recording tape cartridge relating to the embodiment of the present invention.

FIG. 1 shows a perspective view of overall structure of the recording tape cartridge 10. FIG. 2 shows a schematic exploded perspective view of the recording tape cartridge 10.

As shown in these drawings, the recording tape cartridge 10 is structured to rotatably accommodate the single reel 14 in a case 12. The case 12 is substantially rectangular in plan view. A magnetic tape T is wound onto the reel 14. The magnetic tape T serves as a recording tape which is an information recording/replaying medium. Structure of this reel will be described later.

The case 12 is structured by matching up and joining two peripheral walls 16A and 18A, of an upper case 16 and a lower case 18, to one another. A front-right corner portion of each of the upper case 16 and the lower case 18, which is a single corner portion at a front end side in the direction of loading into the drive device, is cut away. An accommodation space for the reel 14 onto which the magnetic tape T is wound is provided inside the case 12. Hence, the cut-away corner portions of the peripheral walls 16A and 18A of the upper case 16 and the lower case 18 serve as an opening 20 for drawing out the magnetic tape T. Details of the opening 20 and a door 50, which opens and closes the opening 20, will be described later.

A leader pin 22 is connected at a free end of the magnetic tape T which is to be drawn out through the opening 20. The leader pin 22 is caught up (engaged) by drawing-out means of the drive device, and subjected to a drawing-out operation. At each of two end portions of the leader pin 22, which protrude beyond width direction end portions of the magnetic tape T, an annular groove 22A is formed. These annular grooves 22A are caught on to by hooks or the like of the drawing-out means. Consequently, in this structure, the hooks or the like do not contact and damage the magnetic tape T when the magnetic tape T is drawn out.

At an inner side of the opening 20 of the case 12, a pair of upper and lower pin stands 24 are provided for positioning and retaining the leader pin 22 in the case 12. The pin stands 24 have semi-tubular forms which open toward the direction of arrow B, and both the end portions of the leader pin 22 are held at recess portions 24A of the pin stands 24 in a state in which the leader pin 22 is standing thereat. The pin stands 24 are provided continuously with ribs 44, which are described below.

A leaf spring 25 is fixedly disposed in a vicinity of the pin stands 24. The leaf spring 25 engages with upper and lower end portions of the leader pin 22, and holds the leader pin 22 at the pin stands 24. The leaf spring 25 has a structure in which an arm portion 25A resiliently deforms as appropriate to allow movement of the leader pin 22 when the leader pin 22 is removed or inserted at the pin stands 24.

A gear aperture 26 is formed at a central portion of the lower case 18. The gear aperture 26 serves as an aperture for exposing a reel gear 66 (which is described later) of the reel 14 to the outside. The reel gear 66 meshes with a driving gear of a drive device and drives the reel 14 to rotate inside the case 12. The reel 14 is held by free play-restricting walls 28 so as not to rattle about. These free play-restricting walls 28 are projectingly provided at interior surfaces of the upper case 16 and the lower case 18, to serve as interior walls which are disposed along portions of a circular path which is coaxial with the gear aperture 26. Further, at the lower case 18, at edge portions of the gear aperture 26, an annular rib 26A is provided protruding toward the inside of the case 12. The annular rib 26A is used for positioning of the reel 14.

A hollow portion 28A is provided continuously with an end portion of the free play-restricting walls 28 in a vicinity of the opening 20. A hole for regulation of position is formed at an interior portion of the hollow portion 28A. Further, a hollow portion 28B is standingly provided in a space which is sandwiched between the free play-restricting walls 28 and a front-left corner portion of the case 12. Another hole for regulation of position, which is a long hole, is formed in the hollow portion 28B. The hollow portions 28A and 28B are disposed co-linearly along the direction of arrow B. Except for an end portion at which the hollow portion 28A is continuously provided, end portions of each of the free play-restricting walls 28 are provided to be continuous with the peripheral wall 16A or the peripheral wall 18A of the case 12. Thus, an outer side of the free play-restricting walls 28 is set apart from the space for disposing the reel 14.

A memory board M is disposed at a rear-right portion of the lower case 18. The memory board M stores various kinds of information for each individual recording tape cartridge 10. A portion of a rear wall 18C, which structures the peripheral wall 18A, is inclined to the extent of a predetermined angle and the memory board M is disposed to be inclined at the predetermined angle. Hence, the memory board M can be detected at a drive device, which reads the memory board M from a lower face side, and at a library apparatus, which reads the memory board M from a rear face side.

Structure Of Opening And Of Case At Opening Vicinity

Figure 3:
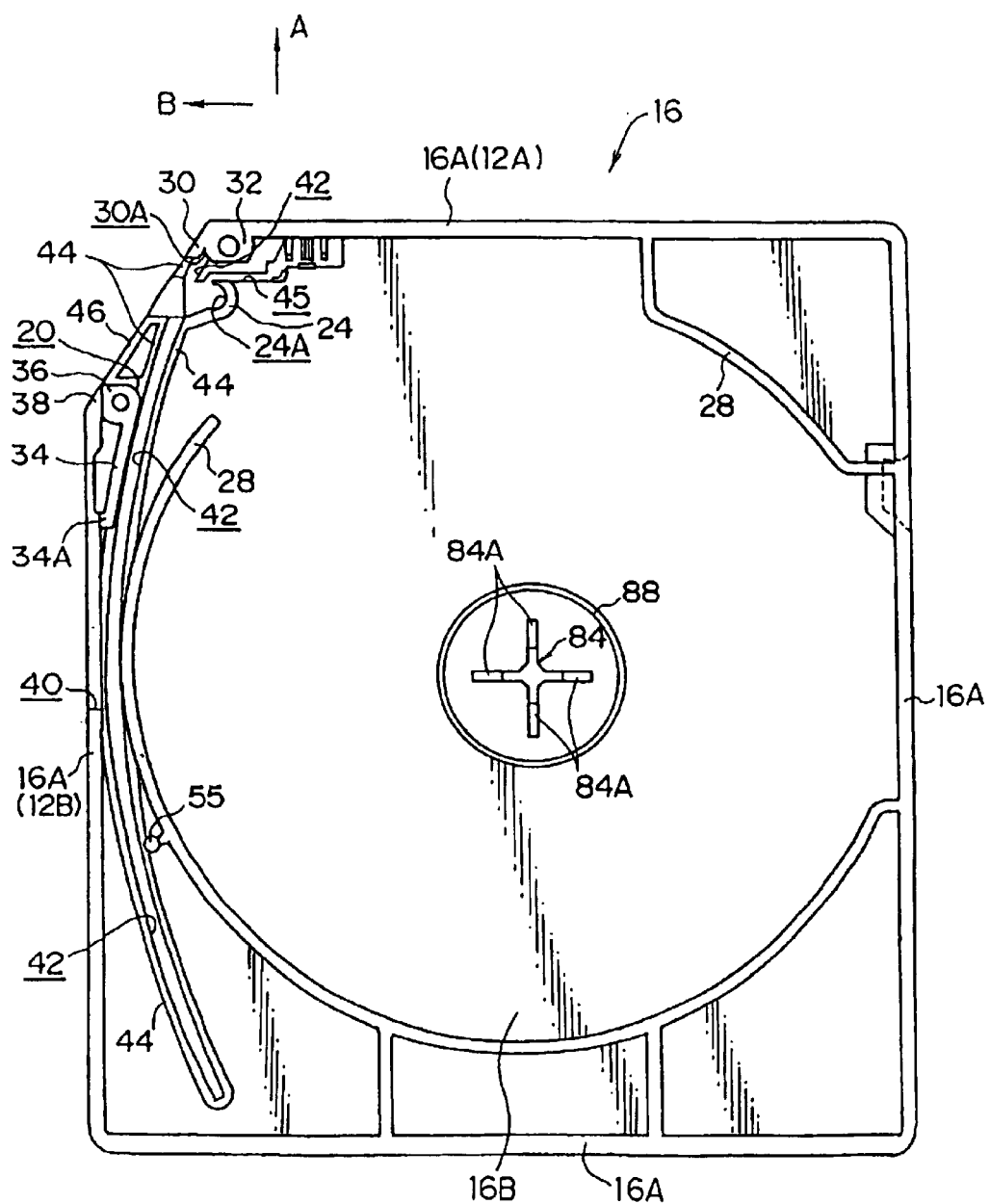
FIG. 3 is a bottom view of an upper case which structures the recording tape cartridge relating to the embodiment of the present invention.
Figure 4:
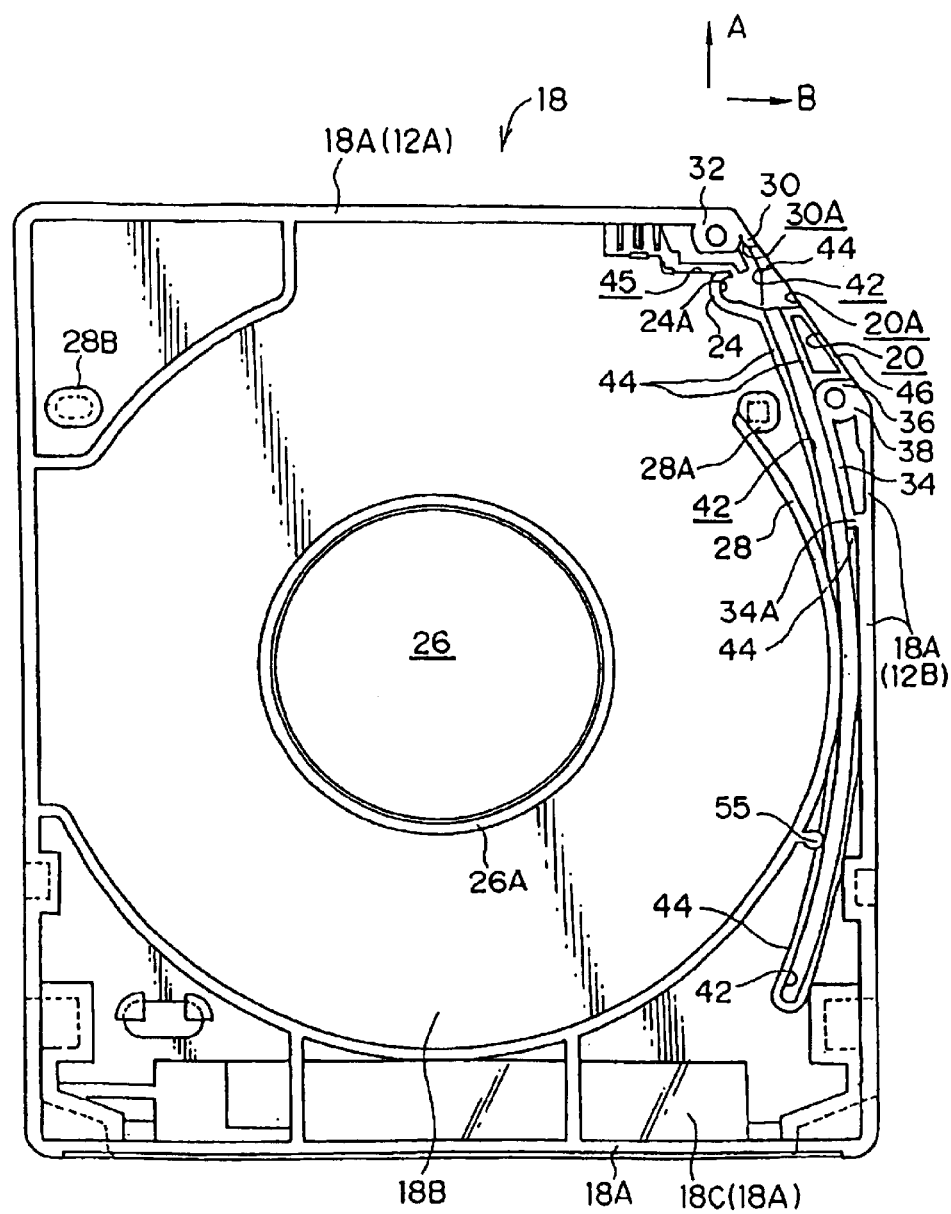
FIG. 4 is a plan view of a lower case which structures the recording tape cartridge relating to the embodiment of the present invention.

As shown in FIG. 3, which is a bottom view of the upper case 16, and FIG. 4, which is a plan view of the lower case 18, respective pairs of upper and lower screw bosses 32 and screw bosses 36 are provided at front and rear edge portions of the opening 20. Together with other screw bosses, which are not shown, the screw bosses 32 and 36 are for screw-fixing to join the upper case 16 with the lower case 18.

The screw bosses 32, which are disposed at the front edge portion of the opening 20, are provided continuously with both a right end portion of a front wall 12A of the case 12 (a portion of the peripheral walls 16A and 18A whose outer surface faces in the direction of arrow A) and a pair of upper and lower anti-dust walls 30, which is inflected a short distance along an opening face of the opening 20 from the right end portion of the front wall 12A. A recess portion 30A is formed between the screw bosses 32 and the anti-dust walls 30. A distal end portion of the door 50, which is described later, enters into the recess portion 30A.

At the screw bosses 36, which are disposed at the rear edge portion of the opening 20, a front end portion of a right wall 12B of the case 12 (a right side wall portion of the peripheral walls 16A and 18A, which runs along the direction of arrow A) is provided continuously with both an inflected wall 38, which is inflected to run substantially along the opening face of the opening 20, and a front end portion of a pair of upper and lower circular arc walls 34, which pair is provided at an inner side of the right wall 12B. The upper and lower circular arc walls 34 are respectively formed in circular arc shapes substantially corresponding with an outer peripheral face of the later-described door 50 (and with a movement path of the door 50) in plan view. The circular arc walls 34 respectively protrude rearward from the screw bosses 36 by a predetermined length. A rear end portion of the circular arc walls 34 is joined with the right wall 12B (the peripheral wall 16A and the peripheral wall 18A) via a short joining wall 34A.

A slit 40 is provided in the right wall 12B of the case 12. The slit 40 has a predetermined length and serves as a window portion which communicates between the interior and exterior of the case 12. The slit 40 is for exposing an operation projection 52 of the later-described door 50. The slit 40 is formed by cutting away a lower portion of the peripheral wall 16A that structures the right wall 12B. A lower portion of the inflected wall 38 of the upper case 16 is also cut away. Thus, the slit 40 also opens forward.

Guide grooves 42 for guiding the door 50 are formed at the upper case 16 and lower case 18 structuring the case 12. Groove walls of the guide grooves 42 are structured by the ribs 44, which are provided standing from a ceiling plate 16B of the upper case 16 and a floor plate 18B of the lower case 18, by the right wall 12B (the peripheral wall 16A and the peripheral wall 18A), and by the free play-restricting walls 28. Thus, the guide grooves 42 are formed without reducing thickness of the ceiling plate 16B and the floor plate 18B. The ribs 44 are provided continuously with the pin stands 24.

Each of the guide grooves 42 is formed in a circular arc shape along a predetermined circular circumference. The recess portion 30A serves as a base end of the guide grooves 42, and the guide grooves 42 reach therefrom to a rear-right corner portion of the case 12. The predetermined circular circumference is determined so as to pass (thread) between the right wall 12B and the free play-restricting walls 28 at an outer side of the screw bosses 32 and at an inner side of the screw bosses 36. In the present embodiment, a center point of the predetermined circular circumference (a center of rotation of the later-described door 50) is specified such that a position (co-ordinate) thereof in the left-right direction is at an outer side relative to a left end of the case 12 and a position (co-ordinate) thereof in the front-rear direction substantially corresponds to a center of rotation of the reel 14 (which is at a center point of the free play-restricting walls 28).

At a portion of the guide channels 42 that is located at the opening 20, the ribs 44 are cut away rightward of the pin stands 24. Thus, the guide channels 42 are communicated with the recess portions 24A, and are communicated with a spring groove 45, at which the arm portion 25A of the leaf spring 25 is disposed. At this cut-away portion of the guide grooves 42, a tapering opening 20A, which guides the leader pin 22 into the case 12, communicates with the recess portions 24A of the pin stands 24. Ribs 46, which are formed along each of a rear edge of the tapering opening 20A, a front end of the screw bosses 36 and the opening face of the opening 20, are provided continuously with the ribs 44. Thus, strength of surroundings of the opening 20 of the case 12 is preserved or improved in spite of the ribs 44 having been cut away.

Rear ends of the ribs 44, which structure rear half portions of the guide grooves 42, curve back on themselves in substantial 'U' shapes. The rib 44 of the upper case 16 is formed to extend further to the rear than the rib 44 of the lower case 18. The purpose of this is to prevent interference between the door 50 and the memory board M disposed at the right wall 12B side of the inclined rear wall 18C, which inclined rear wall 18C (of the peripheral wall 18A) of the lower case 18 is a surface inclined at a predetermined angle.

A pair of upper and lower spring-engaging pins 55 are provided at a length direction central portion of the rear half portion of the ribs 44, at an inner side portion thereof. Each of the spring-engaging pins 55 is provided continuously with the free play-restricting walls 28. The lower case 18 side spring-engaging pin 55 is formed to be longer, and a portion thereof which protrudes further upward than the corresponding free play-restricting wall 28 is a structure at which an annular portion 56A of a coil spring 56, which is described later, hooks on. Hence, the upper case 16 side spring-engaging pin 55, which is shorter, matches up with the lower case 18 side spring-engaging pin 55, such that disengagement of the coil spring 56 is blocked.

In a state in which the peripheral walls 16A and 18A of the upper case 16 and lower case 18 described above are matched together, unillustrated screws are screwed into the screw bosses 32, the screw bosses 36 and other screw bosses from the lower side, and the screw bosses are fixed (joined) to structure the case 12. Here, because the opening 20 is formed by cutting away the front-right corner portion of the rectangular case 12, the opening face of the opening 20 faces in the direction of arrow A and in the direction of arrow B. Consequently, the drawing-out means of the drive device can gain access and chuck the leader pin 22 from the direction of arrow A, from the direction of arrow B, or from a direction between the directions of arrow A and arrow B. As a result, an area in which the pin stands 24 that hold the leader pin 22 can be disposed is larger, and a range from which drawing-out means of drive devices can chuck the leader pin 22 is wider. Accordingly, a position at which the pin stands 24 are to be disposed can be specified to meet specifications of drive devices that carry out chucking from direction A and drive devices that carry out chucking from direction B. Consequently, a degree of freedom of design of the drive devices is broadened.

Structure Of Door

The opening 20 described above is opened and closed by the door 50, which serves as a covering member. The door 50 is curved in a plate thickness direction thereof and is formed in a circular arc form whose curvature substantially coincides with the curvature of the guide grooves 42 (the predetermined circular circumference) in plan view. A portion of the door 50 at a front portion thereof (at least a portion which closes off the opening 20) serves as a closing portion 50A, which is formed with a plate breadth (height) set to be substantially the same as an opening height of the opening 20. A portion of the door 50 that is rearward relative to the closing portion 50A serves as a driven portion 50B, with a plate breadth which is set to be slightly smaller.

Figure 5A:
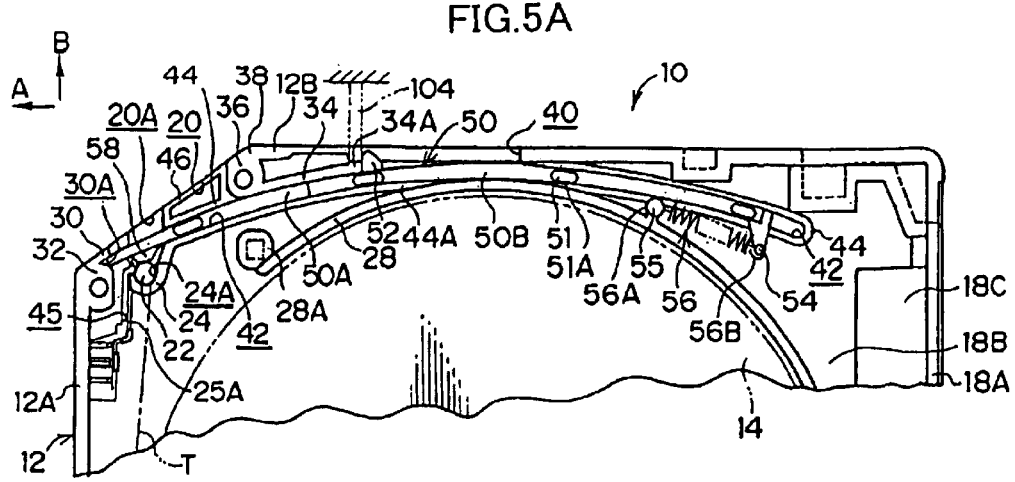
FIG. 5A is a plan view showing an opening process of an opening of the recording tape cartridge relating to the embodiment of the present invention, viewed with the upper case removed, which shows an initial state of engagement of an engaging protrusion of a drive device with an operation projection of a door.

The plate length of the door 50 (the curved length dimension) is determined such that, in a state in which the opening 20 is closed, a rear end portion of the driven portion 50B is disposed inside the rear-right corner portion of the case 12 (see FIG. 5A). A lower-rear portion of the driven portion 50B is cut away at an angle, in order to avoid the memory board M which is disposed at the inclined surface of the inclined rear wall 18C.

Thus, the door 50 is a structure which closes the opening 20 in a state in which a distal end portion of the closing portion 50A enters into the recess portion 30A located at the outer side of the screw bosses 32 (see FIG. 5A). The door 50 moves (rotates) substantially rearward along the guide grooves 42 to open the opening 20 (see FIG. 5B). When an outer peripheral face of a distal end vicinity of the closing portion 50A has reached a vicinity of an inner side of the screw bosses 36, the opening 20 is completely opened (see FIG. 5C). When the opening 20 has been opened, the door 50 can close the opening 20 by rotating substantially in the opposite direction.

Accordingly, the door 50 is formed to be curved so as to open and close the opening 20 by rotating along a movement path thereof without deviating from the predetermined circular circumference. The center of rotation and radius of rotation of the door 50 (the shape of the guide grooves 42) can be suitably determined in accordance with positions of the front and rear edge portions of the opening 20 (the screw bosses 32 and 36), which are determined by requirements of the drive device, and in accordance with an angle of the opening face of the opening 20, which is determined by requirements of the library apparatus, and the like.

A plurality of protrusion portions 51 are protrudingly provided at upper and lower ends of the door 50 and enter into the upper and lower guide grooves 42, respectively. The protrusion portions 51 have different protrusion heights from the closing portion 50A and the driven portion SOB, but distances from a breadth direction center line of the door 50 (along the length direction thereof) to peak portions of the protrusion portions 51 are constant. Hence, the upper and lower protrusion portions 51 slide against the ceiling plate 16B and the floor plate 18B, which are floor portions of the guide grooves 42.

Figure 5B:
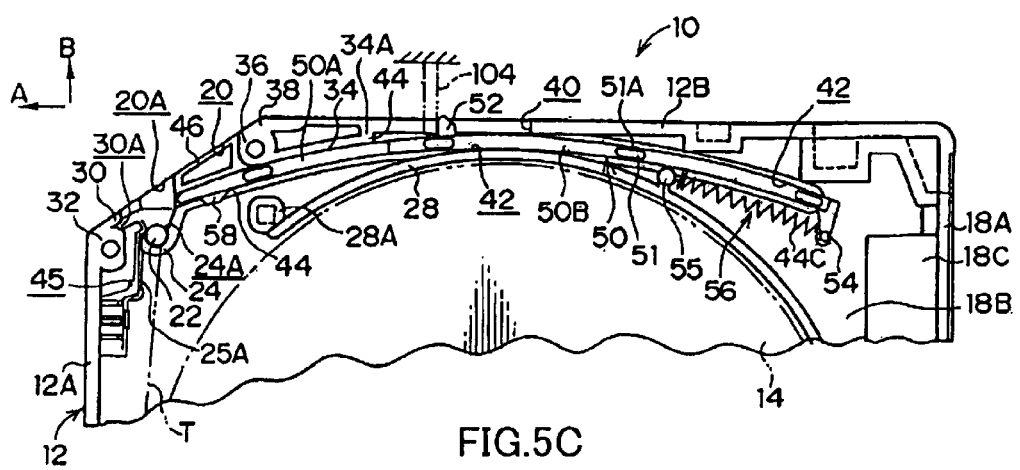
FIG. 5B is a plan view showing the same opening process, which shows a state during opening of the opening.
Figure 5C:
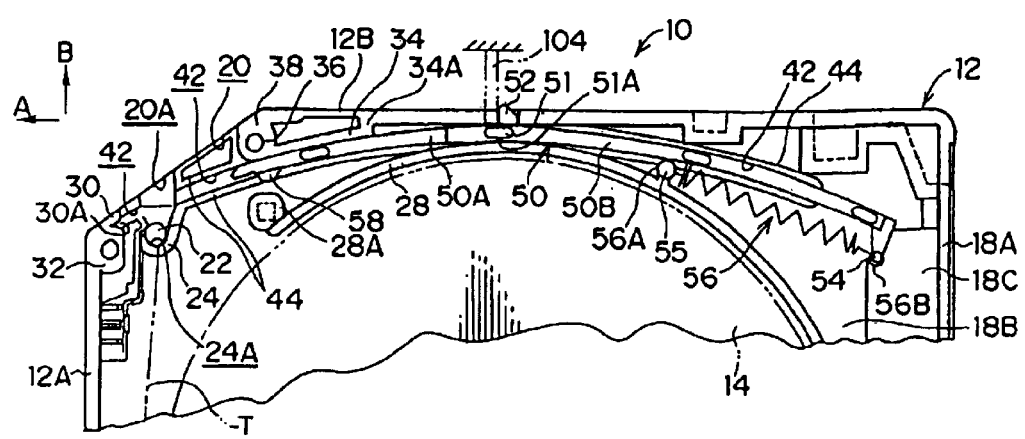
FIG. 5C is a plan view showing the same opening process, which shows a state of completion of opening of the opening.

Protrusions 51A are protrudingly provided at the protrusion portions 51, at both sides in the plate thickness direction of the door 50 (see FIGS. 5A to 5C). Peak portions of the protrusions 51A are in line with plate thickness direction faces of the door 50. The protrusions 51A slide against the groove walls of the guide grooves 42 (the ribs 44 and the like). The protrusion portions 51 that are located furthest toward the front are disposed so as not to enter the tapering opening 20A, which communicates with the guide grooves 42, during the opening/closing process of the opening 20.

Because of the protrusion portions 51 and the protrusions 51A, the door 50 is a structure which is guided in the guide grooves 42 when opening/closing the opening 20, and reliably moves to open by threading between the right wall 12B and the free play-restricting walls 28, at the outer side of the screw bosses 32 and the inner side of the screw bosses 36, without deviating from the aforementioned movement path thereof.

At an outer peripheral portion of the door 50, at a front end vicinity (the closing portion 50A side) of the driven portion SOB, the operation projection 52 projects along a diametric direction of the door 50, to serve as an operation portion. The operation projection 52 is exposed to the outside of the case 12 through the slit 40. With this structure, in accordance with loading (relative movement) of the recording tape cartridge 10 into the drive device, an engagement protrusion 104 advances in through the portion of the slit 40 that opens frontward and engages with the operation projection 52, and the operation projection 52 moves the door 50 in the direction of opening the opening 20.

A spring-engaging portion 54, which has the form of a substantial 'L' shape toward an inner face side of the door 50, is protrudingly provided at a rear end portion of the driven portion 50B of the door 50. The spring-engaging portion 54 has a free end at an upper end side thereof. The coil spring 56, which serves as urging means, is engaged and retained at the spring-engaging portion 54. Specifically, the annular portion 56A and an annular portion 56B are provided at respective end portions of the coil spring 56 for engagement. The annular portion 56A is passed through by the spring-engaging pins 55 of the case 12 and is engaged and retained at the case 12, and the annular portion 56B is passed through by the spring-engaging portion 54 and is engaged and retained at the door 50.

Hence, in this structure, the door 50 is urged in the direction of closing the opening 20 by urging force of the coil spring 56, and the door 50 usually closes the opening 20. The coil spring 56 has a length that reaches as far as the rear-right corner portion of the case 12 in the state in which the door 50 closes the opening 20 as described above. Thus, the coil spring 56 is disposed so as to effectively utilize a space between the free play-restricting walls 28 and the peripheral walls 16A and 18A (and the rear wall 18C) at the rear-right corner portion.

Stoppers 58 are protrudingly provided at the inner face of the closing portion 50A of the door 50. The stoppers 58 abut against an upper end portion side face and a lower end portion side face of the leader pin 22 when the opening 20 is closed. Thus, detachment of the leader pin 22 from the pin stands 24 by falling impacts and the like can be reliably prevented.

With the door 50 of the structure described above, the operation projection 52 is engaged with the engagement protrusion 104 of the drive device by an operation of loading the recording tape cartridge 10 into the drive device (see FIGS. 5A to 5C). Thus, the door 50 moves relative to the case 12, against the urging force of the coil spring 56, and opens the opening 20. At a time of ejection from the drive device, the opening 20 is closed by the urging force of the coil spring 56.

Further, the door 50, which is curvedly formed in the circular arc shape, is rotated to open and close the opening 20, which is angled with respect to the direction of arrow A, by swinging around an outer side of the reel 14 and the pin stands 24 (and the leader pin 22) without deviating from the movement path along the shape of the curvature. Thus, the door 50 is a structure which will not protrude beyond an external profile region of the case 12 during opening and closing of the opening 20.

Structure Of Reel And Brake Structure

As is shown in FIGS. 2 and 6, the reel 14 is provided with a reel hub 60 with the form of a substantially circular tube with a base. The reel hub 60 includes a tubular portion 60A and a base portion 60B. The magnetic tape T is wound onto the tubular portion 60A at an outer peripheral face thereof. The base portion 60B closes off a lower portion of the tubular portion 60A. At a vicinity of the base portion 60B side end portion (lower end portion) of the reel hub 60, a lower flange 62 is coaxially and integrally provided at a diametric direction outer side of the reel hub 60. Further, an upper flange 64 is coaxially joined to an upper end portion of the reel hub 60 by ultrasound welding or the like. An internal diameter of the upper flange 64 is set to be substantially the same as an internal diameter of the tubular portion 60A, and an external diameter of the upper flange 64 is set to be the same as an external diameter of the lower flange 62.

Thus, at the reel 14, the magnetic tape T is wound round the outer peripheral face of the tubular portion 60A of the reel hub 60 between opposing faces of the lower flange 62 and the upper flange 64, and the tubular portion 60A opens upward. The external diameter of the lower flange 62 and the upper flange 64 is set to be slightly smaller than an internal diameter of the free play-restricting walls 28 of the case 12. Thus, the reel 14 is rotatable inside the case 12.

Figure 7:
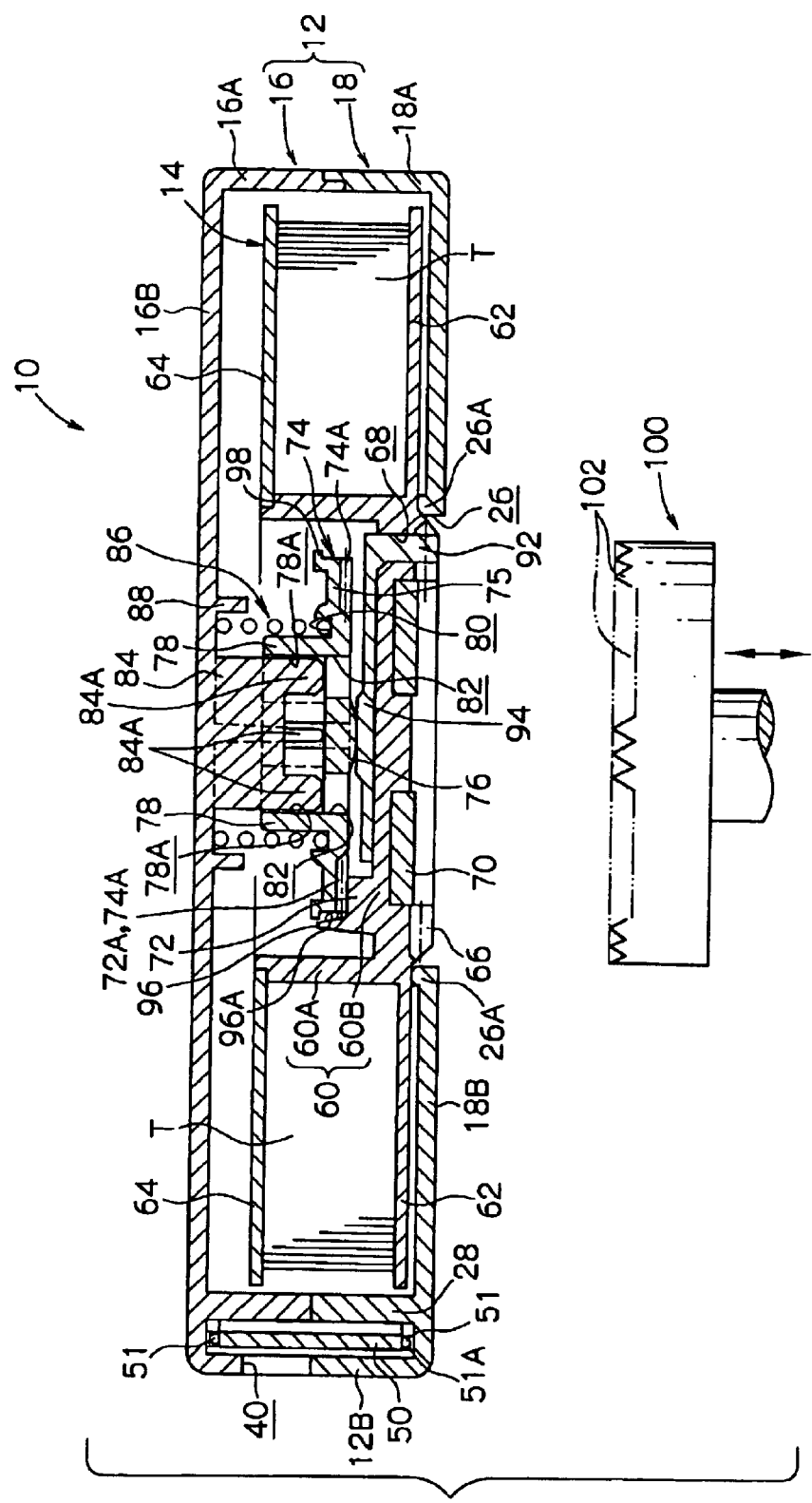
FIG. 7 is a sectional view showing a rotation-locked state of the reel of the recording tape cartridge relating to the embodiment of the present invention.

As shown in FIG. 7, a lower peripheral portion of the base portion 60B of the reel hub 60 protrudes slightly beyond a lower face of the lower flange 62, and the reel gear 66, which is formed in an annular shape, is provided at an outer peripheral vicinity of a lower end face of the base portion 60B. The reel gear 66 is specified so as to be meshable with a driving gear 102, which is provided at a distal end of a rotation shaft 100 of the drive device.

Through-holes 68, which pass through the base portion 60B (and the reel gear 66), are provided at three locations, which are equally spaced, on a circular periphery at a region at which the reel gear 66 is disposed. A diameter of each through-hole 68 is greater than a gear pitch of the reel gear 66, and the teeth of the reel gear 66 are not provided in a vicinity around each through-hole 68.

A reel plate 70, which is an annular plate formed of a magnetic material which is capable of adsorption by magnetism, is provided at the lower end face of the base portion 60B of the reel hub 60, at the inner side of the reel gear 66. The reel plate 70 is provided integrally by insert-molding.

The lower end portion of the base portion 60B of the reel hub 60, which protrudes beyond the lower flange 62, is inserted (fitted with play) into the gear aperture 26 of the case 12 in a state in which a diametric direction inner end portion of the lower flange 62 abuts against an upper end portion of the annular rib 26A. Hence, the reel gear 66 and the reel plate 70 are exposed to outside the case 12.

Figure 8:
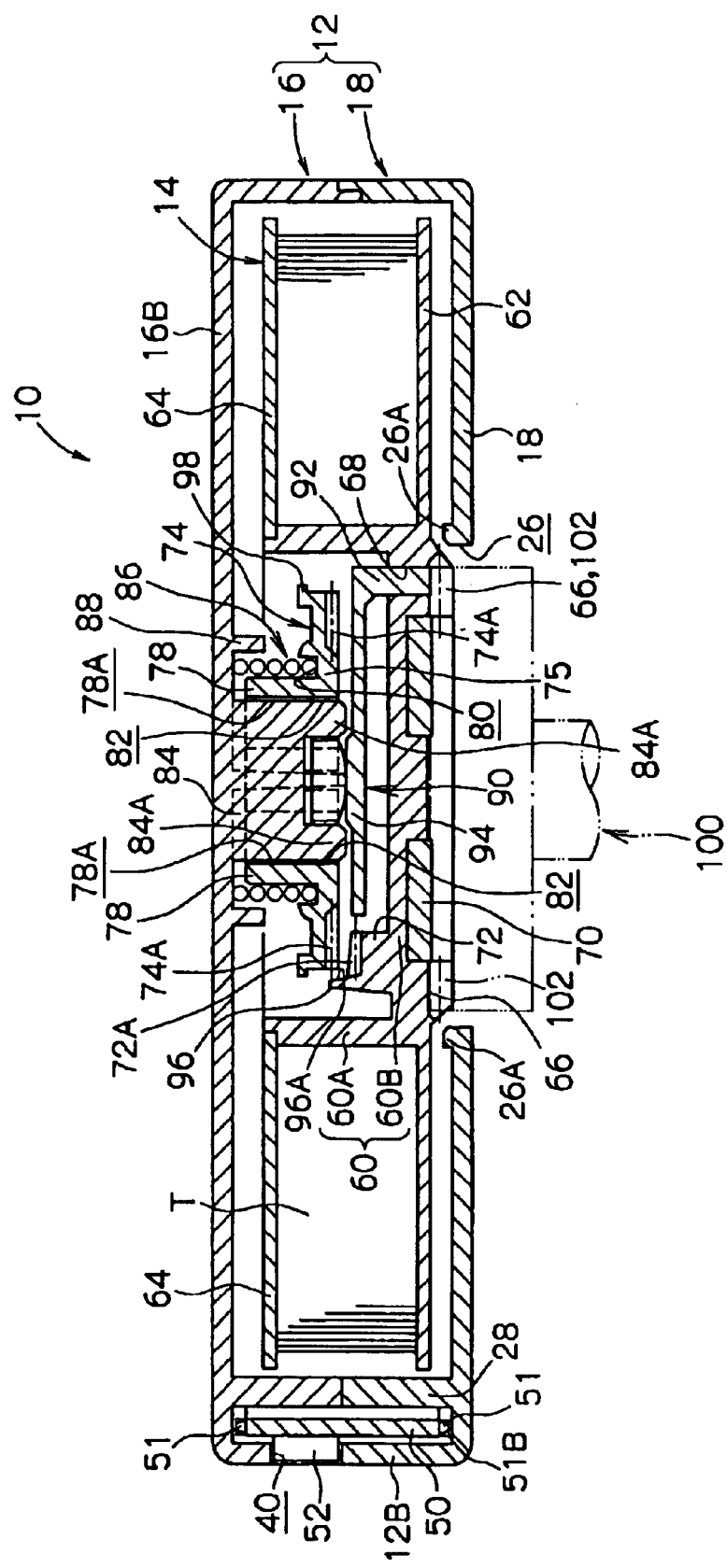
FIG. 8 is a sectional view showing a rotation-enabled state of the reel of the recording tape cartridge relating to the embodiment of the present invention.
Figure 9:
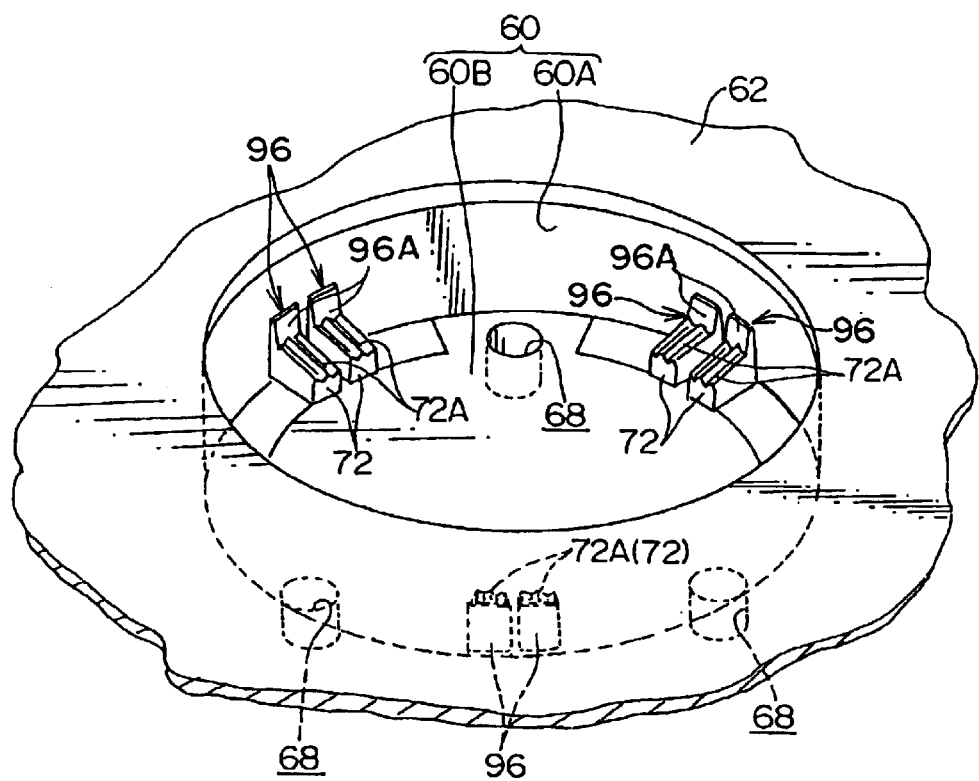
FIG. 9 is an enlarged perspective view of an interior portion of a reel hub which structures the recording tape cartridge relating to the embodiment of the present invention.

As shown in FIGS. 2 and 9, pairs of engaging protrusions 72 (six protrusions in total) are standingly provided at an upper face of the base portion 60B of the reel hub 60. The engaging protrusions 72 are equally spaced on the circular periphery, at three locations between the respective through-holes 68. As shown in FIG. 8, gear teeth 72A are formed at distal end portions (upper end portions) of the engaging protrusions 72. These gear teeth 72A are meshable with a brake gear 74A of a brake member 74, which is described later. The engaging protrusions 72 correspond to 'protrusions' of the present invention.

Tapering walls 96 are standingly provided at the base portion 60B of the reel hub 60. These tapering walls 96 will be described later.

The recording tape cartridge 10 is further equipped with a brake structure for blocking rotation of the reel 14 at times of non-use. This brake structure is equipped with the brake member 74, which serves as a 'brake member' of the present invention. The brake member 74 is provided with a disc portion 75, which is formed substantially in a circular plate shape. The brake gear 74A, which is meshable with the gear teeth 72A of the reel 14, is formed in an annular shape at an outer peripheral vicinity of a lower end face of the disc portion 75. Each tooth of the brake gear 74A has a free-standing end at an outer peripheral portion of the disc portion 75.

A rubbing protrusion portion 76 is protrudingly provided at a central portion of a lower face of the disc portion 75. The rubbing protrusion portion 76 abuts against a release pad 90, which is described later. The rubbing protrusion portion 76 is formed substantially in a spherical surface shape, so as to be substantially in point contact with the release pad 90.

As shown in FIG. 2, the brake member 74 is provided with an X-form protrusion 78, which is formed substantially in a cross shape in plan view and is provided standing from an upper face of the disc portion 75. At an interior portion of the X-form protrusion 78, an insertion channel 78A is formed in a shape corresponding to the X-form protrusion 78. In other words, the X-form protrusion 78 structures channel walls of the insertion channel 78A. A spring-holding recess portion 80 is also formed at the upper face of the disc portion 75, at an outer side of the X-form protrusion 78. The spring-holding recess portion 80 is surrounded by a wall portion with an annular shape in plan view.

The brake member 74 is also provided with through-holes 82, which pass through the disc portion 75 in a thickness direction thereof. The through-holes 82 are formed so as to communicate between diametric direction outer side portions of the brake member 74 and the insertion channel 78A, which is formed in a cross shape in plan view, except at an intersection portion, which is an axial center portion of the insertion channel 78A. The through-holes 82 are divided between four parts, which are formed in rectangular shapes, to correspond to these diametric direction outer side portions. The through-holes 82 are each located at the diametric direction outer side relative to the rubbing protrusion portion 76.

The brake member 74 is equipped with a rim portion 98, which is provided to extend to the diametric direction outer side from an outer peripheral portion of the disc portion 75. This rim portion 98 will be described later, together with the tapering walls 96 of the reel 14.

The brake member 74 described above is insertedly disposed in the tubular portion 60A of the reel hub 60 so as to be movable in a vertical direction (an axial direction of the reel 14) and substantially coaxial with the tubular portion 60A. Thus, when the brake member 74 moves in the vertical direction, the brake gear 74A of the brake member 74 can attain a position at which the brake gear 74A meshes with the gear teeth 72A of the engaging protrusions 72 provided at the reel hub 60 (a rotation-locking position, which is a meshed position) or a position at which this meshing is released (a release position).

An X-form rib 84 (see FIGS. 3 and 6), which serves as an engaging protrusion, is provided protruding downward from the ceiling plate 16B of the case 12. The X-form rib 84 enters into the insertion channel 78A of the X-form protrusion 78 of the brake member 74. The X-form rib 84 has a baffle form, which is formed as two thin plates which are intersected so as to be perpendicular. With this structure, rotation of the brake member 74 relative to the case 12 is blocked by engagement of the X-form protrusion 78 (i.e., the channel walls of the insertion channel 78A) with the X-form rib 84.

Accordingly, in the state in which the brake gear 74A of the brake member 74 is meshed with the gear teeth 72A of the reel hub 60, rotation of the reel 14 is blocked. The X-form rib 84 is maintained in a state of being inserted in the insertion channel 78A over the whole of a movement stroke of the brake member 74 in the vertical direction. Thus, this is a structure which provides a function of guiding movement directions of the brake member 74 to the vertical direction.

Protruding plates 84A are provided extending downward from four locations at a lower (distal) end portion of the X-form rib 84, except at the aforementioned intersection portion. The respective protruding plates 84A are inserted into the through-holes 82 of the brake member 74 (i.e., protrude to pass through the through-holes 82 toward the brake gear 74A side of the brake member 74) when the brake member 74 is disposed at the release position. Thus, the X-form rib 84 including the protruding plates 84A is structured to greatly increase an engagement amount (insertion depth) of the X-form rib 84 with the brake member 74 and to suppress inclination of the brake member 74 with respect to the case 12. In the present embodiment, the engagement amount, in the axial direction, of the X-form rib 84 including the protruding plates 84A with the brake member 74 that is disposed at the rotation-locking position is specified to be significantly larger than the whole of the movement stroke of the brake member 74 (see FIGS. 7 and 8).

A compression coil spring 86, which serves as an 'urging member' of the present invention, is disposed between the spring-holding recess portion 80 of the brake member 74 and the ceiling plate 16B. One end portion of the compression coil spring 86 is fitted into the spring-holding recess portion 80 and another end portion thereof is fitted inside an annular wall portion 88, which is provided protruding from the ceiling plate 16B at an outer side of the X-form rib 84. Thus, the compression coil spring 86 will not be displaced in diametric directions thereof.

With this structure, the brake member 74 is urged downward by urging force of this compression coil spring 86, the brake gear 74A is usually meshed with the gear teeth 72A, and the brake gear 74A reliably prevents undesired rotation of the reel 14 (i.e., the brake member 74 is disposed at the rotation-locking position). Also due to this urging force, the reel 14 whose engaging protrusions 72 are meshed with the brake member 74 is urged downward and, as mentioned earlier, the lower flange 62 abuts against the annular rib 26A such that the reel 14 is not loose inside the case 12.

The release pad 90, which serves as a release member, is disposed between the base portion 60B and the brake member 74 inside the reel hub 60 (the tubular portion 60A) of the reel 14. The release pad 90 is formed in a flat plate form with a substantially equilateral triangle shape in plan view. Three circular column-form leg portions 92 are provided protruding from a lower face of the release pad 90, at a vicinity of each corner portion thereof. The leg portions 92 correspond, respectively, with the through-holes 68 of the base portion 60B. A rubbing protrusion portion 94 is provided protruding to a low height from a central portion of an upper face of the release pad 90. The rubbing protrusion portion 94 abuts against the rubbing protrusion portion 76 of the brake member 74.

In a state in which the leg portions 92 are inserted through the through-holes 68, so as to be movable in the vertical direction, the release pad 90 rests on the base portion 60B of the reel hub 60 so as not to interfere with the engaging protrusions 72 (the lower face of the release pad 90 abuts against the upper face of the base portion 60B). In this state, the leg portions 92 protrude beyond lower end portions of the through-holes 68 such that distal ends of the leg portions 92 are at substantially the same level as tooth peaks of the reel gear 66. Hence, with this structure, because the rubbing protrusion portion 94 abuts against the rubbing protrusion portion 76 of the brake member 74, the release pad 90 is maintained in this state in which the leg portions 92 are protruding by the urging force of the compression coil spring 86.

However, when the leg portions 92 are pushed to move upward against the urging force of the compression coil spring 86, the release pad 90 pushes the brake member 74, which is abutting against the rubbing protrusion portion 94 of the release pad 90, upward and releases the meshing of the brake gear 74A with the gear teeth 72A of the engaging protrusions 72 (i.e., moves the brake member 74 to the release position).

Specifically, at a time when the driving gear 102 meshes with the reel gear 66 of the reel 14, the rotation shaft 100 is relatively moving in an upward direction with respect to the case 12. Consequently, the leg portions 92 of the release pad 90 are pushed by tooth peaks of the driving gear 102. Thus, in accordance with an operation of meshing the driving gear 102 with the reel gear 66, the reel 14 rises in the case 12 against the urging force of the compression coil spring 86 (i.e., the lower flange 62 is separated from the annular rib 26A), a rotation-blocked state caused by the brake member 74 is released, and the reel 14 becomes rotatable in the case 12.

In this state, the leg portions 92 of the release pad 90 are disposed in the through-holes 68 of the reel hub 60. Thus, with this structure, the release pad 90 rotates with the reel 14 when the rotation shaft 100 rotates. Therefore, the brake member 74 and the release pad 90 relatively rotate during rotation of the reel 14, and the rubbing protrusion portions 76 and 94, which are mutually abutting portions, rub together.

Next, the tapering walls 96 of the reel 14 and the rim portion 98 of the brake member 74 will be described.

As shown in FIG. 9, the tapering walls 96 are provided at the engaging protrusions 72, at an inner peripheral face side of the tubular portion 60A (at an outer side in the diametric direction of the reel hub 60). The tapering walls 96 are provided standing from the base portion 60B, integrally with the engaging protrusions 72. That is, the tapering walls 96 are disposed in respective pairs at three locations (making six divisions in total) which are equidistant on a circular periphery which is coaxial with the base portion 60B.

Figure 10:
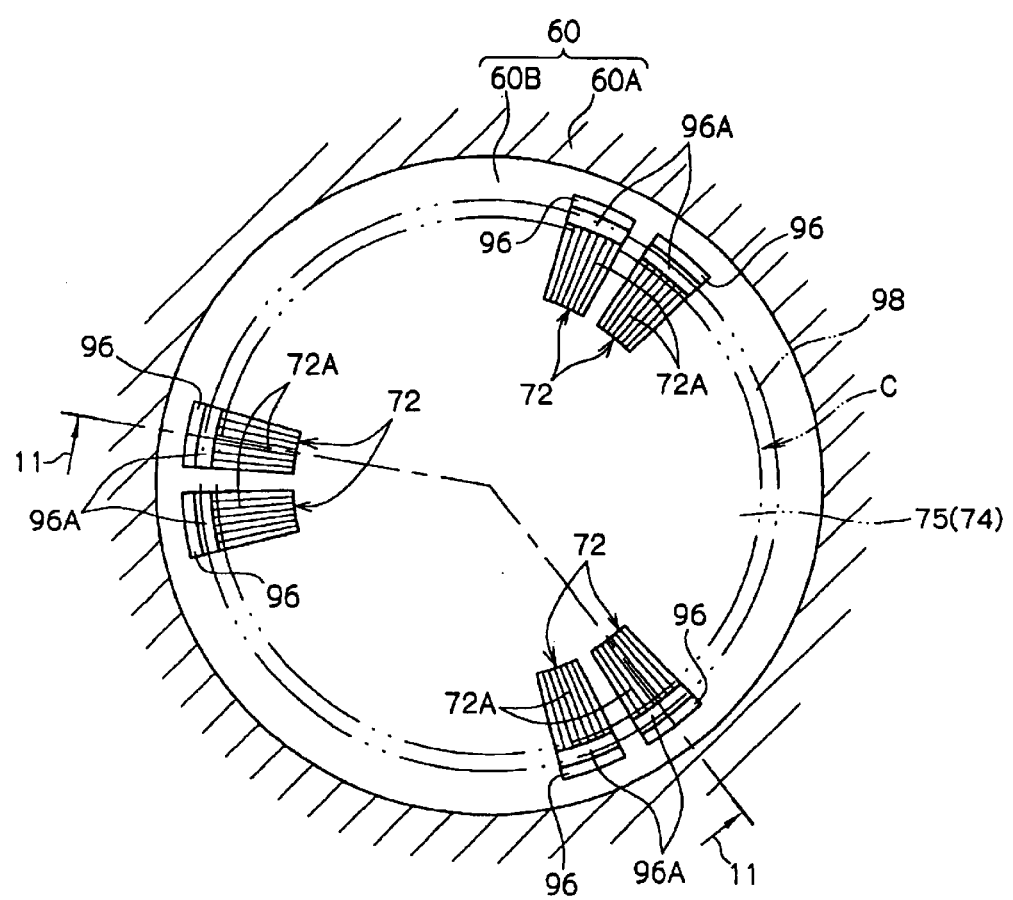
FIG. 10 is a plan view showing a relationship between tapering walls and a brake member which structure the recording tape cartridge relating to the embodiment of the present invention.
Figure 11:
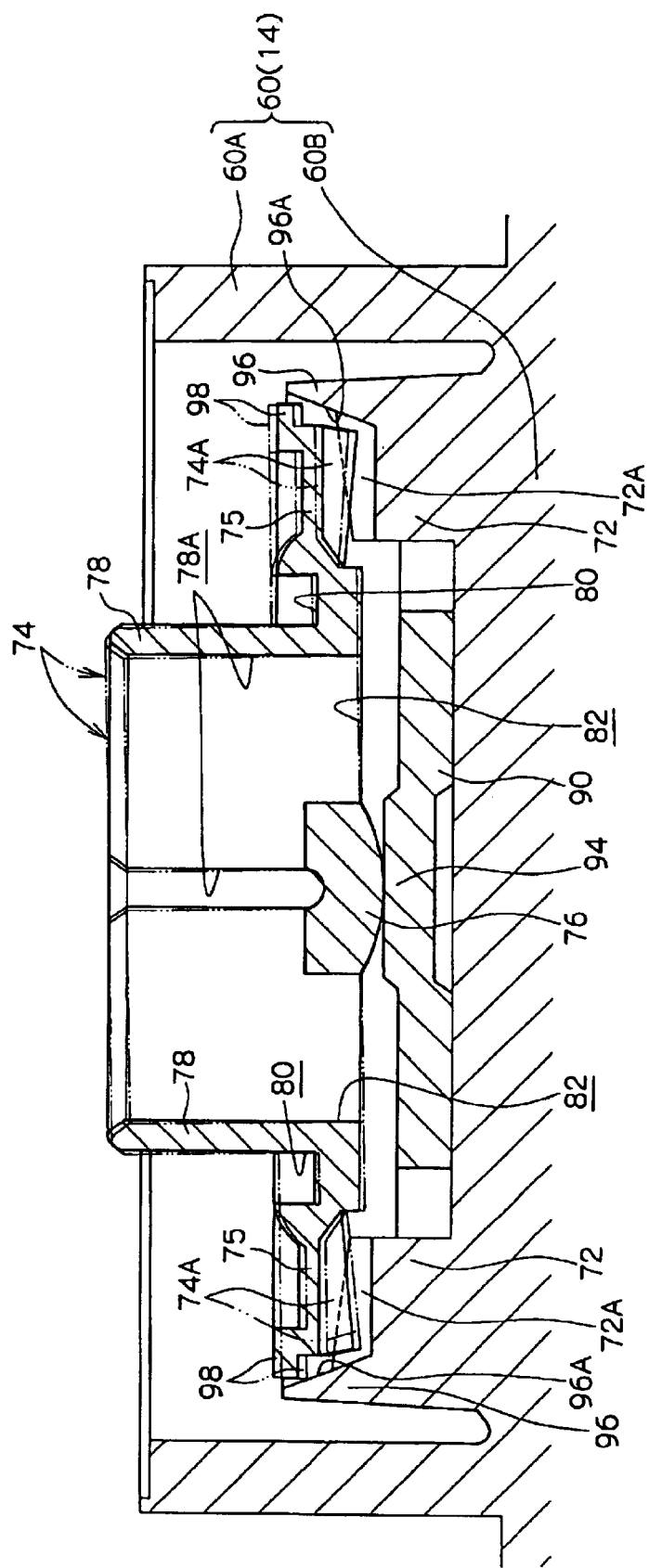
FIG. 11 is a sectional view showing the relationship between the tapering walls and the brake member, which structure the recording tape cartridge relating to the embodiment of the present invention.

As shown in FIG. 10, in plan view, each tapering wall 96 is formed in a circular arc shape which is coaxial with the reel hub 60, and in side view, a face of each tapering wall 96 that faces toward the axial center side of the reel hub 60 is formed as a tapering surface 96A. As shown in FIG. 11, this tapering surface 96A is formed as an angled surface which is continuously inclined such that an upper side thereof is separated from the axial center of the reel hub 60 by more than a lower side (the base portion 60B side) thereof (i.e., the tapering wall 96 becomes thinner toward the upper side). Dimensions and the like of the tapering walls 96 are described below. Note that the tapering surface 96A is not limited to a form which is a straight line in sectional view, and may be formed in a curved shape in sectional view.

A diameter of an unillustrated imaginary circle joining inner edge portions of the tapering surfaces 96A, which are formed in the circular arc shape in plan view, at upper end portions (tooth base portions of the gear teeth 72A) of the engaging protrusions 72 (i.e., an imaginary circle joining diametric direction outer edges of the gear teeth 72A, which circle is coaxial with the reel hub 60) is set to be slightly greater than an external diameter of the disc portion 75, excluding the rim portion 98 (i.e., the imaginary circle C shown in FIG. 10, which is an imaginary circle joining diametric direction outer end portions of the brake gear 74A). Therefore, the diameter of an imaginary circle joining upper end inner edge portions of the respective tapering surfaces 96A is significantly larger than the outer diameter of the disc portion 75 (see FIGS. 10 and 11).

Hence, the respective tapering walls 96, by the tapering surfaces 96A thereof, guide the brake member 74 that is being inserted (assembled) into the tubular portion 60A of the reel hub 60 such that the brake member 74 is centered with respect to the axial center of the reel hub 60. That is, the respective tapering walls 96 are a structure which guides the brake member 74, which is moving toward the base portion 60B side and being inserted into the reel hub 60, such that the brake gear 74A meshes properly with the respective gear teeth 72A.

Further, a height of the tapering walls 96 is determined such that upper end portions of the tapering surfaces 96A are disposed at an upper side relative to the tooth peaks of the brake gear 74A when the brake member 74 is disposed at the release position. Accordingly, when the brake member 74 is returned to the rotation-locking position by the urging force of the compression coil spring 86, even if, for example, the brake member 74 is mispositioned (off-centered, inclined or the like), the brake member 74 is guided (led in) by the tapering walls 96 and the brake gear 74A is properly meshed with the gear teeth 72A.

Anyway, as shown in FIG. 11, the rim portion 98 is integrally provided at the disc portion 75 of the brake member 74. The rim portion 98 extends out to a diametric direction outer side from an outer peripheral portion of the disc portion 75, along the whole periphery thereof. That is, the rim portion 98 extends out to the diametric direction outer side further than a diametric direction outer edge portion of the brake gear 74A. Further, the rim portion 98 is disposed at an upper side relative to the brake gear 74A.

When the brake gear 74A meshes with the gear teeth 72A (when the brake member 74 is disposed at the rotation-locking position), the rim portion 98 is disposed at an inner side (the reel hub 60 axial center side) of the tapering surfaces 96A. That is, an external diameter of the rim portion 98 is set to be larger than the imaginary circle joining the inner edge portions of the tapering surfaces 96A at the upper end portions of the engaging protrusions 72, and smaller than the diameter of an imaginary circle joining upper end inner edge portions of the tapering surfaces 96A.

Thus, with this structure, when the brake member 74 is being inserted into the tubular portion 60A of the reel hub 60, at an initial stage of this insertion, the brake member 74 is principally guided by the tapering surfaces 96A at diametric direction outer end portions of the tooth peaks of the brake gear 74A (outer peripheral face lower portions of the disc portion 75, excluding the rim portion 98). Thereafter, the brake member 74 is guided by the tapering surfaces 96A at these end portions of the brake gear 74A and/or at outer peripheral face lower portions of the rim portion 98. Further, when the brake member 74 is disposed at the release position, the lower end of the rim portion 98 is disposed at an upper side relative to the upper end of the tapering walls 96, and the rim portion 98 will not interfere with the tapering walls 96, which rotate relative thereto during rotation of the reel 14.

Furthermore, when the brake member 74 is disposed at the rotation-locking position, outer edge portions of the rim portion 98 are closer to the tapering surfaces 96A than the diametric direction outer end portions of the tooth peaks of the brake gear 74A (i.e., the outer edge portions of the disc portion 75).

Figure 12:
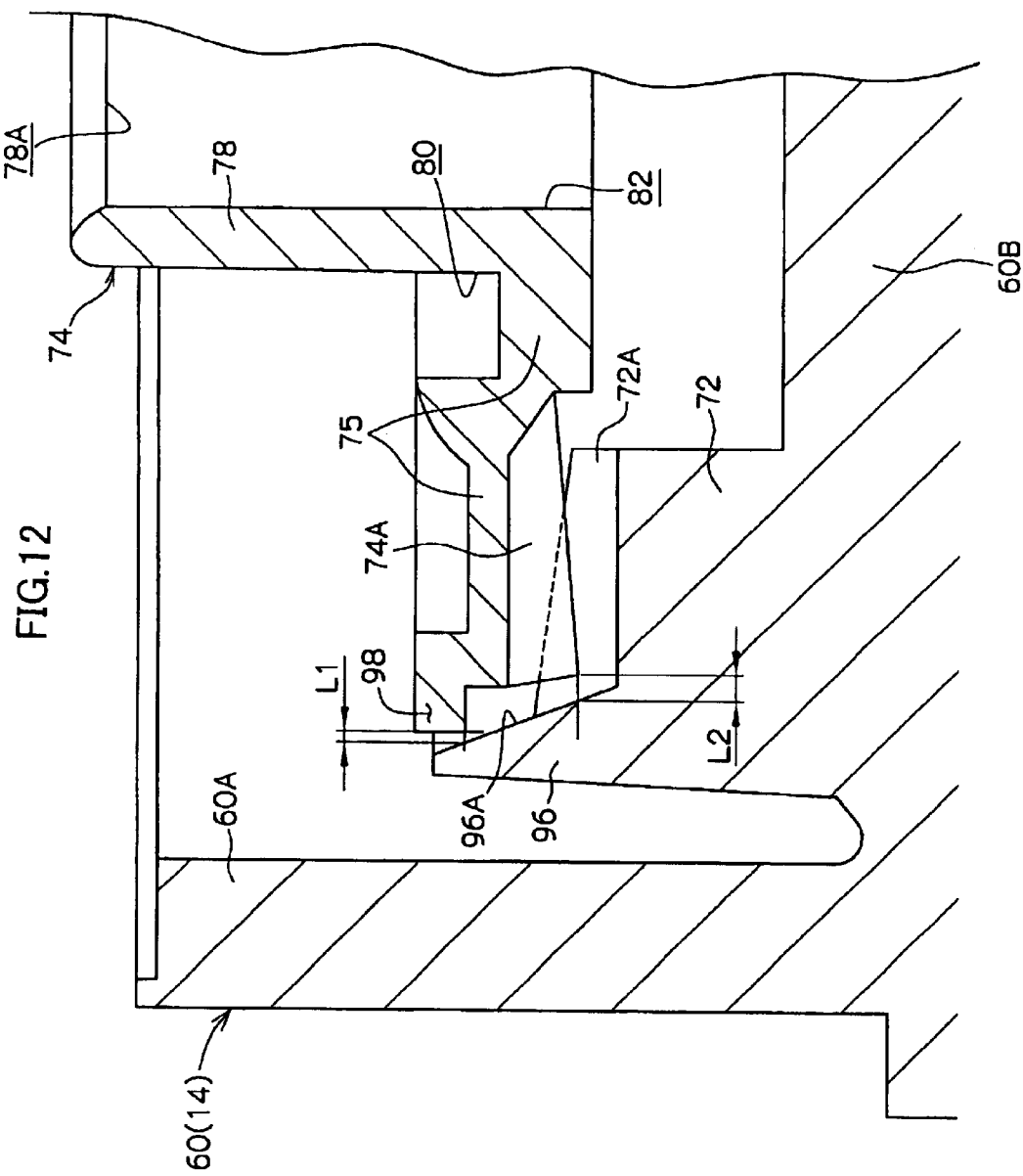
FIG. 12 is an enlarged sectional view showing a positional relationship between the tapering walls and a rim portion of the brake member, which structure the recording tape cartridge relating to the embodiment of the present invention.
Figure 13:
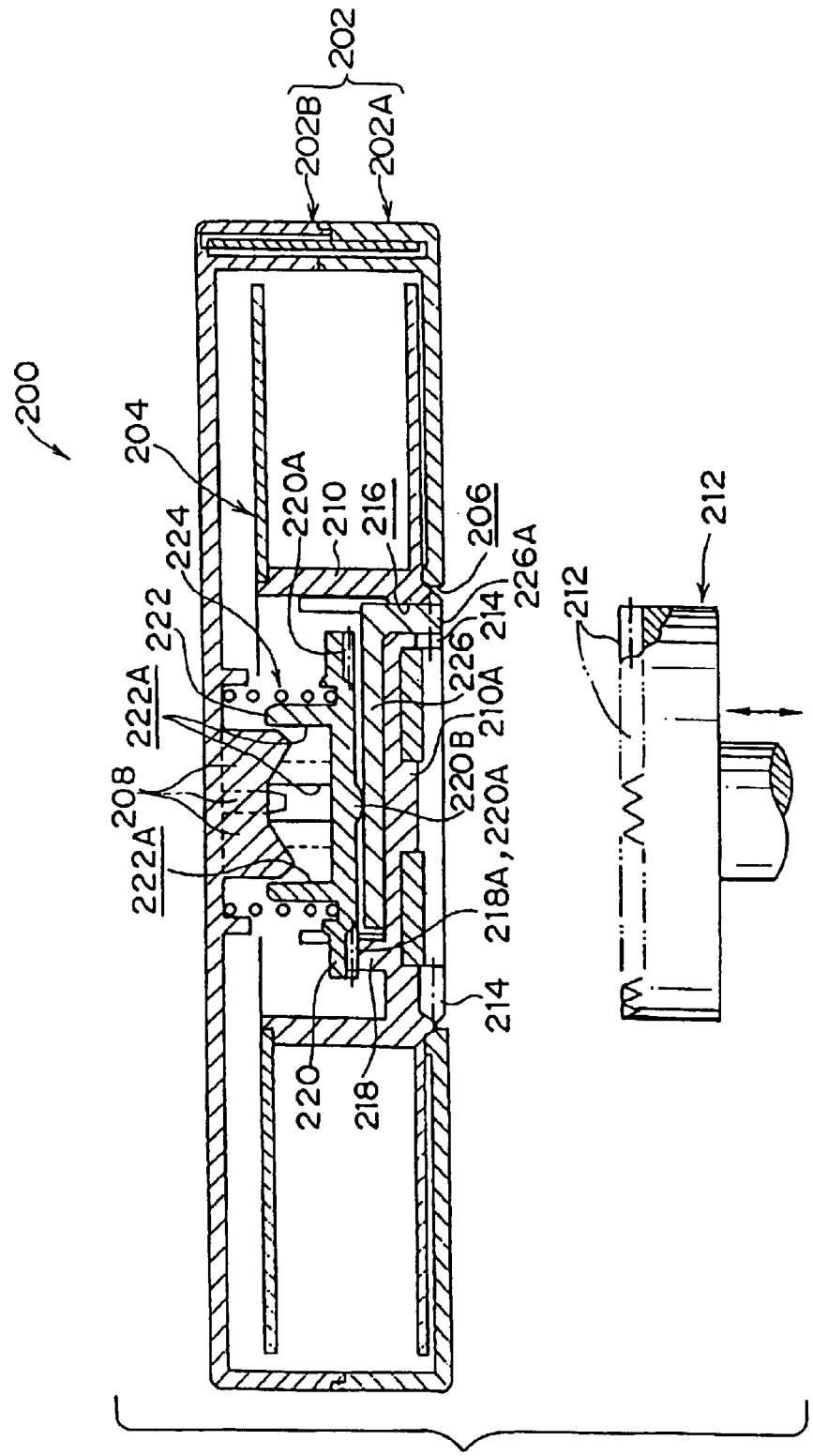
FIG. 13 is a sectional view showing a rotation-locked state of a reel of a conventional recording tape cartridge.
Figure 14:
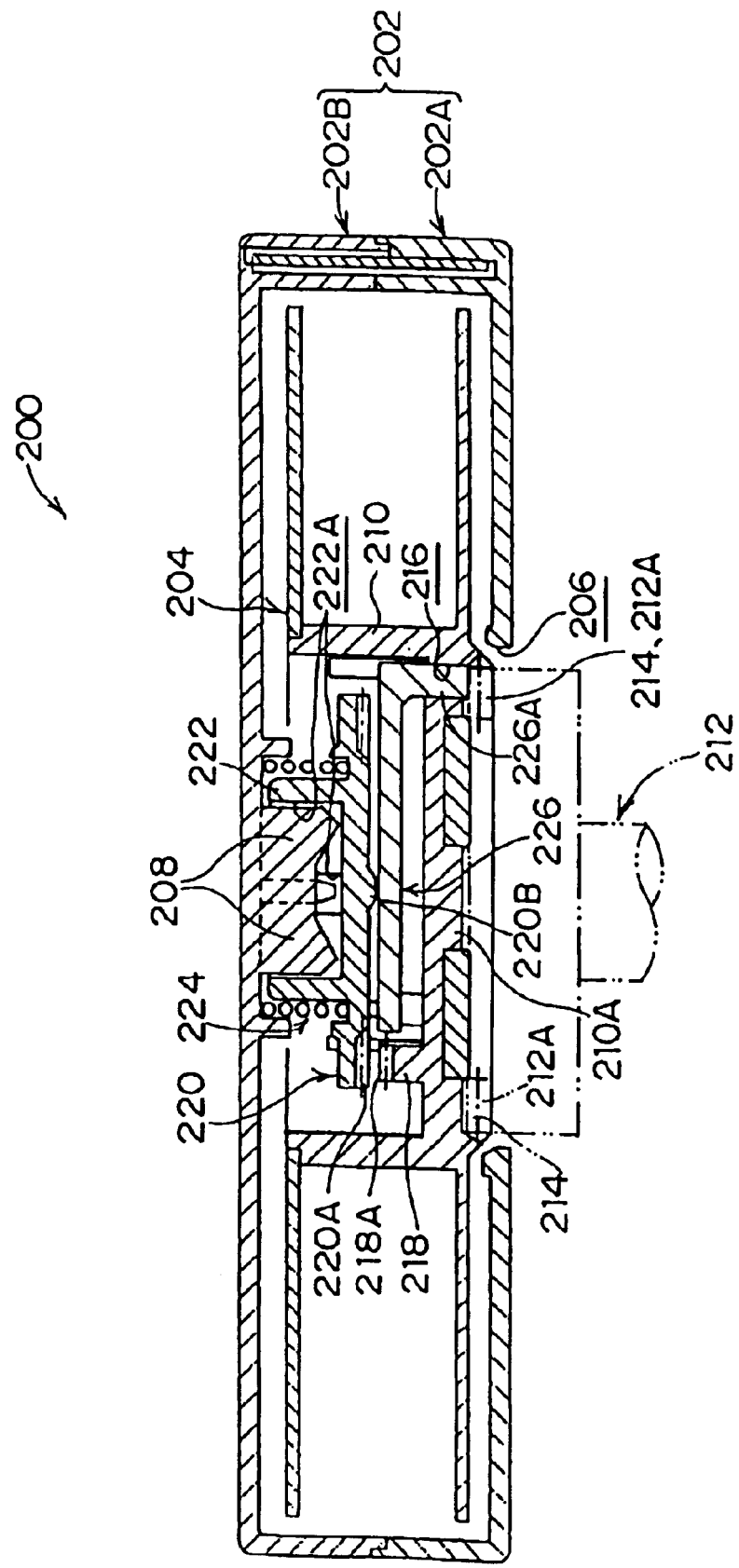
FIG. 14 is a sectional view showing a rotation-enabled state of the reel of the conventional recording tape cartridge.

Specifically, dimensions of each portion are determined such that, as shown in FIG. 12, when the brake member 74 is disposed at the rotation-locking position, a separation L1 along the diametric direction of the reel hub 60 from the outer edge portion of the rim portion 98 to the tapering surfaces 96A is slightly smaller than a separation L2 along the diametric direction of the reel hub 60 from the diametric direction outer edge portions of the tooth peaks of the brake gear 74A to the tapering surfaces 96A (i.e., L1<L2).

Therefore, if the brake member 74 starts to become off-centered in the diametric direction relative to the reel hub 60, or starts to become inclined in the reel hub 60, the rim portion 98 will interfere with (abut against) the tapering surfaces 96A at positions which are distal relative to the brake gear 74A.

Next, operation of the present embodiment will be described.

In the recording tape cartridge 10 having the structure described above, the distal end portion of the door 50 is entered into the recess portion 30A by the urging force of the coil spring 56 and the door 50 closes the opening 20 when the recording tape cartridge 10 is not in use (during storage, during transportation, and the like).

Further, as shown in FIG. 7, the urging force of the compression coil spring 86 is transmitted through the brake member 74 which is meshed with the engaging protrusions 72 (and through the release pad 90) to the reel 14. As a result, the lower flange 62 is pressed (abutted) against the annular rib 26A, and the reel gear 66 is exposed through the gear aperture 26.

Hence, the brake gear 74A of the brake member 74 is meshed with the gear teeth 72A of the engaging protrusions 72 by the urging force of the compression coil spring 86, and rotation of the reel 14 relative to the case 12 is blocked. In other words, the brake member 74 is disposed at the rotation-locking position.

In contrast, when the magnetic tape T is to be used, the recording tape cartridge 10 is loaded into a bucket (not shown) of a drive device along the direction of arrow A. In accordance with this loading, the engaging protrusion 104, which is fixed at the bucket, engages with the operation projection 52 of the door 50. Hence, the door 50 rotates substantially rearward and opens the opening 20.

Then, when the recording tape cartridge 10 has been loaded to a predetermined depth in the drive device, the bucket descends, and the rotation shaft 100 of the drive device relatively approaches (moves upward) toward the gear aperture 26 of the case 12 and retains the reel 14. Specifically, the rotation shaft 100 adsorbs and retains the reel plate 70 by means of, for example, an electromagnet (not shown) which is disposed at a distal end portion of the rotation shaft 100, and the driving gear 102 of the rotation shaft 100 is meshed with the reel gear 66.

In accordance with the meshing of the reel gear 66 with the driving gear 102, tooth peaks of the driving gear 102 abut against the distal ends (lower end faces) of the leg portions 92 of the release pad 90, and push the release pad 90 upward against the urging force of the compression coil spring 86. As a result, the brake member 74, which abuts against the release pad 90 at the rubbing protrusion portion 76, also moves upward, and the meshing of the brake gear 74A of the brake member 74 with the gear teeth 72A of the engaging protrusions 72 is released.

When the rotation shaft 100 moves further upward, the reel 14 pushes the release pad 90 and the brake member 74 up together (without changing relative positions thereof), against the urging force of the compression coil spring 86, and the lower flange 62 moves away from the annular rib 26A. As a result, the reel 14 rises in the case 12 and becomes rotatable, in a state of non-contact with inner faces of the case 12.

In this state, in which the recording tape cartridge 10 has been positioned within the drive device by the descent of the bucket, the drawing-out means of the drive device draws out the leader pin 22 through the opened opening 20, and accommodates the leader pin 22 at a winding reel of the drive device. Then, the winding reel and the reel 14 (the rotation shaft 100) are driven to rotate synchronously by the drive device, and the magnetic tape T is wound round the winding reel while being sequentially drawn out from the case 12. Information recording/replaying is carried out on the magnetic tape T by a recording/replaying head or the like which is disposed along a predetermined tape path.

At this time, the rubbing protrusion portion 76 of the brake member 74, which is not rotatable with respect to the case 12, rubs against the rubbing protrusion portion 94 of the release pad 90 which, together with the reel 14, rotates relative to the case 12.

Subsequently, when the magnetic tape T has been wound back to the reel 14 again and the leader pin 22 has been retained at the pin stands 24, the magnetic force of the above-mentioned electromagnet is turned off, the adsorption of the rotation shaft 100 with the reel plate 70 is released, and the bucket in which the recording tape cartridge 10 is loaded rises.

Accordingly, the meshing of the reel gear 66 with the driving gear 102 is released, and the abutting of the driving gear 102 against the leg portions 92 of the release pad 90 is released. Thus, the release pad 90 is moved downward together with the brake member 74 (while maintaining the abutting state therebetween) by the urging force of the compression coil spring 86.

Hence, the leg portions 92 of the release pad 90 respectively protrude through the through-holes 68 as far as the portion at which the reel gear 66 is formed, and the brake gear 74A of the brake member 74 meshes with the gear teeth 72A of the engaging protrusions 72. That is, the brake member 74 returns to the rotation-locking position for blocking rotation of the reel 14.

Further, in accordance with the operation of moving the brake member 74 and the release pad 90 by the urging force of the compression coil spring 86, the reel 14 also moves downward, and returns to the initial state thereof, in which the lower flange 62 abuts against the annular rib 26A and the reel gear 66 is exposed through the gear aperture 26.

When the recording tape cartridge 10 is to be ejected from the bucket, the recording tape cartridge 10 is moved in the direction opposite to the direction of arrow A by the urging force of the coil spring 56 and/or by an unillustrated ejection mechanism. In accordance with this movement, the door 50 closes the opening 20 due to the urging force of the coil spring 56. Thus, the recording tape cartridge 10 is ejected from the drive device and returns to the initial state thereof.

When the reel 14 and the brake structure are to be assembled to this recording tape cartridge 10, first, the reel 14 is accommodated at the inner side of the free play-restricting wall 28 of the lower case 18 such that the lower end portion of the reel hub 60 is entered into the annular rib 26A and the reel gear 66 is exposed through the gear aperture 26. Then, the release pad 90 is placed on the base portion 60B of the reel hub 60, while the leg portions 92 are respectively inserted into the through-holes 68.

From this state, the brake member 74, whose brake gear 74A is oriented to the lower side, is moved downward substantially along the axial direction so as to enter in at the inner side of the tapering walls 96, and the brake member 74 is placed on the engaging protrusions 72, which protrude beyond the upper face of the release pad 90. As a result of this operation, the gear teeth 72A and the brake gear 74A mesh with one another in accordance with the mutual forms of the teeth thereof. Further, the rubbing protrusion portion 76 abuts against the rubbing protrusion portion 94. In this state, the brake member 74 is disposed such that the X-form rib 84 (and the protruding plates 84A) can be entered into the insertion channel 78A when the upper case 16 is joined to the lower case 18.

Then, the compression coil spring 86 is placed in the spring-holding recess portion 80 of the brake member 74. From this state, while the X-form rib 84 (and the protruding plates 84A) is entering into the insertion channel 78A of the brake member 74 and the compression coil spring 86 is being compressed (against the urging force of the compression coil spring 86), the upper case 16 is brought closer to the lower case 18. Then, when the peripheral wall 16A and the peripheral wall 18A have been matched up, the upper case 16 and the lower case 18 are joined at the respective upper and lower screw bosses 32, screw bosses 36 and other screw bosses.

As a result, the reel 14 is accommodated in the case 12 and the brake structure is constituted in the recording tape cartridge 10, and rotation of the reel 14 relative to the case 12 is blocked during shipping and the like, which are times of non-use of the recording tape cartridge 10.

Here, at the base portion 60B of the reel hub 60, at which the brake member 74 moves in a direction substantially along the axis thereof to be inserted, the tapering walls 96 are standingly provided along a circle with a diameter larger than the external diameter of the brake member 74, and the diameter of the imaginary circle adjoining the diametric direction outer edges of the gear teeth 72A at respective base (lower end) portions of the tapering surfaces 96A of the tapering walls 96 is slightly larger than the external diameter of the disc portion 75 of the brake member 74. Therefore, in accordance with this operation, the brake member 74 is guided in by the tapering surfaces 96A to the position at which the brake gear 74A of the brake member 74 properly meshes with the gear teeth 72A.

In other words, in accordance with this insertion operation, the brake member 74 is guided by the tapering walls 96 in a direction such that the axial center of the brake member 74 coincides with the axial center of the reel hub 60. Therefore, when the brake member 74 is inserted at the reel hub 60, the tooth peaks of the brake gear 74A are prevented from riding up on the tooth peaks of the gear teeth 72A.

Further, at the brake member 74, because the rim portion 98 is provided extending from the outer peripheral portion at the diametric direction outer side of the brake member 74, at the upper side relative to the brake gear 74A, and the rim portion 98 is disposed at the inner side of the tapering walls 96 when the brake member 74 is disposed at the rotation-locking position (the meshing position), the brake member 74 is reliably guided in to the meshing position. Specifically, in the initial period of guiding of the brake member 74 by the tapering walls 96, the brake member 74 is guided by the tapering walls 96 at the diametric direction outer edges of the tooth peaks of the brake member 74 which are disposed at the base portion 60B side of the brake member 74 (i.e., outer peripheral face lower portions of the disc portion 75). Thereafter, depending on position and attitude of the brake member 74 relative to the reel hub 60, the brake member 74 is guided by the tapering surfaces 96A at the brake gear 74A and/or the rim portion 98 (mainly the rim portion 98). Therefore, even if the brake gear 74A starts to ride up on the gear teeth 72A during the guiding in of the brake member 74 by the tapering walls 96, the rim portion 98 interferes with the tapering surfaces 96A, and off-centering or inclination of the brake member 74 is restricted. Thus, the riding up is reliably blocked.

In particular, because the separation L1 between the rim portion 98 and the tapering surfaces 96A is smaller than the separation L2 between the tooth peaks of the brake member 74 and the tapering surfaces 96A when the brake member 74 is disposed in the rotation-locking position, if the brake member 74 starts to off-center or incline relative to the reel hub 60 during the guiding in, the rim portion 98 will interfere with the tapering surfaces 96A at positions which are distal relative to the outer edges of the tooth peaks of the brake member 74. As a result, the position and attitude of the brake member 74 relative to the reel hub 60 are restricted. In other words, off-centering and inclination of the brake member 74 relative to the reel hub 60 are restricted, and riding up of the tooth peaks of the brake gear 74A on the tooth peaks of the gear teeth 72A is even more reliably prevented.

More specifically, if the brake member 74 starts to be inserted in a state in which the brake member 74 is inclined relative to the reel hub 60, if the rim portion 98 was not provided, then there would be a risk of the brake gear 74A riding up on the gear teeth 72A at diametric (and circumferential) direction portions of the brake member 74, because the diameter of the imaginary circle joining the diametric direction outer edges of the gear teeth 72A at the base portions of the tapering surfaces 96A is slightly larger than the external diameter of the disc portion 75. However, because the rim portion 98 is provided, the rim portion 98 abuts against the tapering surfaces 96A, as shown by the imaginary lines in FIG. 11. Therefore, the above-mentioned inclination is corrected while the brake member 74 is reliably guided in to the meshing position.

Thus, with the recording tape cartridge 10 relating to the present embodiment, the brake member 74 which blocks rotation of the reel 14 can be properly assembled during an assembly operation.

Further, because the tapering walls 96 and the rim portion 98 are provided, meticulous operation to make the axial center of the brake member 74 coincide with the axial center of the reel hub 60 is not required when the brake member 74 is being inserted at the reel hub 60, and ease of assembly is improved.

Further again, because the tapering walls 96 are provided standing from the base portion 60B integrally with the engaging protrusions 72, the above-described function of reliably meshing the brake gear 74A with the gear teeth 72A when the brake member 74 is being inserted at the reel hub 60 can be effected without thickened portions of the base portion 60B of the reel hub 60 being increased in number (and without adversely affecting moldability of the reel hub 60, which is generally formed by molding).

The embodiment described above has a structure in which the tapering walls 96 are plurally provided along portions of a circular periphery whose diameter is larger than the external diameter of the brake member 74. However, the present invention is not limited thus. It is sufficient if the tapering walls 96 are provided along a circular periphery which has a diameter larger than the external diameter of the brake member 74 and which is coaxial with the reel hub 60. For example, the tapering wall 96 may be formed in an annular form. In such a case, the rim portion 98 may be provided extending out only from portions of the outer peripheral portion of the disc portion 75. As another example, the tapering walls 96 may be provided separately from the engaging protrusions 72. In such a case, positions of the tapering walls 96 may be offset in the circumferential direction relative to the engaging protrusions 72.

Further still, the embodiment described above has a structure in which the rubbing protrusion portion 94 is provided for releasing the state in which rotation of the reel 14 is locked by the brake member 74. However, the present invention is not limited thus. For example, a structure is possible in which the brake member 74 is directly pushed by a release protrusion of the rotation shaft 100 which advances into a through-hole provided at an axial center portion of the base portion 60B of the reel hub 60, and hence the brake member 74 moves to the release position. In such a case, rather than providing the engaging protrusions 72 so that the gear teeth 72A are provided at positions that do not interfere with the release pad 90, it is possible to provide the engaging protrusions 72 in an annular form at the base portion 60B of the reel hub 60.

Further yet, the embodiment described above has a structure which is a "one-reel" recording tape cartridge accommodating the single reel 14 in the case 12. However, the present invention is not limited thus. For example, the recording tape cartridge 10 could be a "two-reel" recording tape cartridge accommodating two of the reel 14, for unwinding and for winding up. Thus, the present invention is not limited by preferable structures of the opening 20, the door 50 and so forth.

Furthermore, the embodiment described above has a structure in which a magnetic tape T is employed as the recording tape. However, the present invention is not limited thus. It is sufficient that the recording tape is one of long tape-form information recording/replaying media which can record information and replay information that has been recorded. Of course, the recording tape cartridge relating to the present invention can be applied to recording tape of any kind of recording/replaying system.

As has been explained above, a recording tape cartridge relating to the present invention has excellent effects in that a brake member which blocks rotation of a reel at times of non-use can be correctly assembled.

What is claimed is:

1. A tape cartridge comprising:

a reel;

a brake member mounted at the reel so as to be reciprocally movable between a locking position for prohibiting rotation of the reel and an unlocking position for enabling rotation of the reel, the brake member including a disc portion provided at a mounting side thereof and a rim portion provided at a side of the brake member which is opposite to the mounting side thereof; and a guidance structure capable of guiding an outer periphery of the mounting side disc portion and capable of guiding the rim portion, for controlling attitude of the brake member at least during mounting of the brake member, wherein the disc portion comprises a brake gear, and the rim portion extends in a diametric direction beyond an outer peripheral portion of the brake gear.

2. The tape cartridge of claim 1, wherein the guidance structure is provided at the reel.

3. The tape cartridge of claim 2, wherein the guidance structure comprises a plurality of engaging protrusions.

4. The tape cartridge of claim 3, wherein the engaging protrusions are disposed with a predetermined spacing along a predetermined circular periphery whose center is at an axis of rotation of the reel.

5. The tape cartridge of claim 3, wherein the engaging protrusions comprise tapering walls for guiding the mounting side disc portion outer periphery and the rim portion, and gear teeth for blocking rotation of the reel when the brake member is at the locking position.

6. The tape cartridge of claim 5, wherein when the brake member is disposed at the locking position, a clearance between the rim portion and the tapering walls is smaller than a clearance between the disc portion and the tapering walls.

7. The tape cartridge of claim 5, wherein the brake gear of the brake member meshes with the gear teeth when the brake member is disposed at the locking position.

8. The tape cartridge of claim 7, wherein the brake gear is formed at a mounting side face of the disc portion.

9. The tape cartridge of claim 1, further comprising a case which rotatably accommodates the reel.

10. The tape cartridge of claim 9, further comprising a structure for prohibiting rotation of the case relative to the brake member.

11. The tape cartridge of claim 9, wherein, when the brake member is disposed at the locking position, rotation of the case relative to the reel is prohibited.

12. The tape cartridge of claim 1, wherein the reel comprises a tubular portion at a center thereof, and the brake member is mounted at an inner side of the tubular portion.

13. The tape cartridge of claim 1, wherein the brake member is movable between the locking position and the unlocking position by translation in a direction of an axis of rotation of the reel.

14. The tape cartridge of claim 1, further comprising an urging member which continuously urges the brake member toward the locking position.

15. The tape cartridge of claim 1, further comprising a release pad for causing the reciprocal movement of the brake member by transmitting force from outside the tape cartridge.

* * * * *